US011210112B1

(12) United States Patent
Tan et al.

(10) Patent No.: US 11,210,112 B1
(45) Date of Patent: Dec. 28, 2021

(54) SYSTEM AND METHOD OF UTILIZING GRAPHICAL USER INTERFACE PROFILES

(71) Applicant: Dell Products L.P., Round Rock, TX (US)

(72) Inventors: Danilo Ong Tan, Austin, TX (US); Daniel Lawrence Hamlin, Round Rock, TX (US); Shun-Tang Hsu, Taipei (TW); Nathan Benjamin Buch, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/242,734

(22) Filed: Apr. 28, 2021

(51) Int. Cl.
| | | |
|---|---|---|
| *G06F 3/048* | (2013.01) | |
| *G06F 9/451* | (2018.01) | |
| *G06F 3/0481* | (2013.01) | |
| *G06F 3/0484* | (2013.01) | |
| *G06F 9/54* | (2006.01) | |

(52) U.S. Cl.
CPC ............ *G06F 9/451* (2018.02); *G06F 3/0481* (2013.01); *G06F 3/0484* (2013.01); *G06F 9/542* (2013.01)

(58) Field of Classification Search
None
See application file for complete search history.

(56) References Cited

U.S. PATENT DOCUMENTS

| | | | | |
|---|---|---|---|---|
| 2013/0120447 A1* | 5/2013 | Kim | ...................... | G06F 3/0482 345/629 |
| 2014/0325433 A1* | 10/2014 | Hiroura | ................. | G06F 3/0482 715/789 |
| 2014/0351748 A1* | 11/2014 | Xia | ........................ | G06F 3/0481 715/798 |
| 2019/0102059 A1* | 4/2019 | Strinden | ............... | G06F 3/0486 |

OTHER PUBLICATIONS

Dell UltraSharp 34 Curved USB-C Monitor: U3419W, Retrieved from url:https://www.dell.com/si/business/p/dell-u3419w-monitor/pd, Retrieved on Apr. 16, 2021.

* cited by examiner

*Primary Examiner* — Thanh T Vu
(74) *Attorney, Agent, or Firm* — Baker Botts L.L.P.

(57) ABSTRACT

In one or more embodiments, one or more systems, one or more methods, and/or one or more processes may receive first user input that indicates a first graphical user interface (GUI) profile, which includes first multiple GUI zones that are adjacent and non-overlapping; receive second user input that associates first multiple graphical user interfaces (GUIs) with the first multiple GUI zones; receive third user input that indicates a second GUI profile, which includes second multiple GUI zones that are adjacent and non-overlapping; receive fourth user input that associates second multiple GUIs with the second multiple GUI zones; display the first multiple GUIs within the first multiple GUI zones of the first GUI profile; determine that an event has occurred; determine that the event is associated with the second GUI profile; and display, via the display, the second multiple GUIs via the second multiple GUI zones of the second GUI profile.

20 Claims, 14 Drawing Sheets

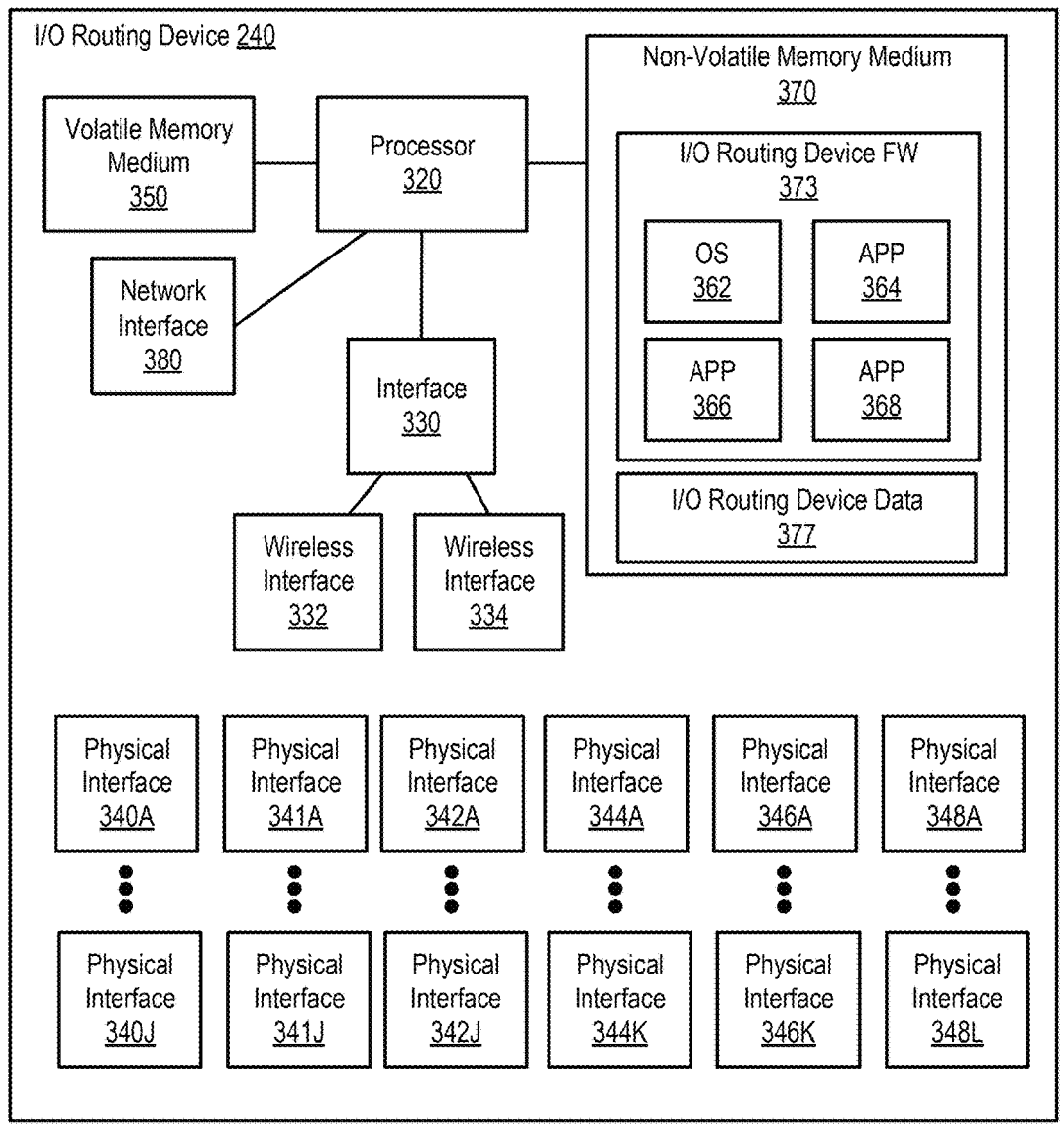
FIG. 3A
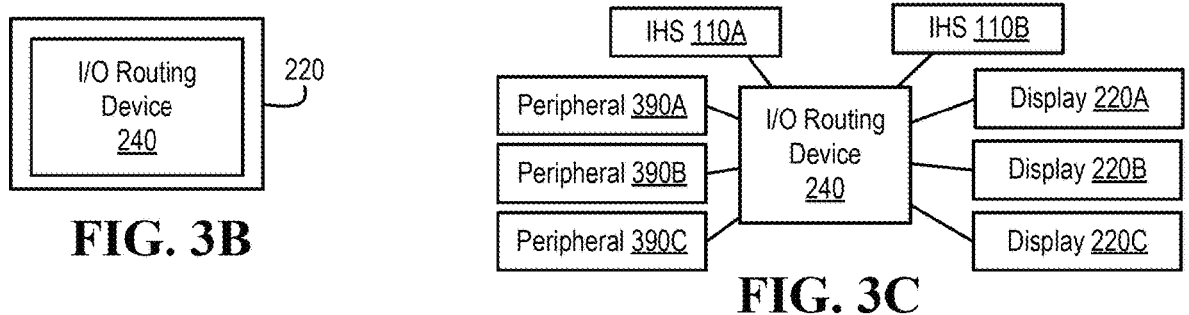
FIG. 3B
FIG. 3C

SYSTEM AND METHOD OF UTILIZING GRAPHICAL USER INTERFACE PROFILES

BACKGROUND

Field of the Disclosure

This disclosure relates generally to information handling systems and more particularly to utilizing graphical user interface profiles.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, by a first information handling system, first user input that indicates a first graphical user interface (GUI) profile, which includes first multiple GUI zones that are adjacent and non-overlapping; may receive, by the first information handling system, second user input that associates first multiple graphical user interfaces (GUIs) with the first multiple GUI zones; may receive, by the first information handling system, third user input that indicates a second GUI profile, which includes second multiple GUI zones that are adjacent and non-overlapping; may receive, by the first information handling system, fourth user input that associates second multiple GUIs with the second multiple GUI zones; may display, via a display communicatively coupled to the first information handling system, the first multiple GUIs within the first multiple GUI zones of the first GUI profile; may determine, by the first information handling system, that an event has occurred; may determine, by the first information handling system, that the event is associated with the second GUI profile; and may display, via the display, the second multiple GUIs via the second multiple GUI zones of the second GUI profile.

In one or more embodiments, at least two of the first multiple GUIs may be GUIs of a single application. In one or more embodiments, the event may be associated with a date and a time. For example, determining that the event has occurred may include determining that a present time and a present date matches the date and the time. In one or more embodiments, the one or more systems, the one or more methods, and/or the one or more processes may further: store physical location information associated with the second GUI profile; and determine present physical location information associated with the first information handling system. For example, determining that the event has occurred may include determining that the present physical location information associated with the first information handling system matches the physical location information associated with the second GUI profile.

In one or more embodiments, the one or more systems, the one or more methods, and/or the one or more processes may further receive fifth user input indicating at least one of a contrast level value, a brightness level value, and a gamut level value associated with the second GUI profile. For example, displaying the second multiple GUIs via the second multiple GUI zones of the second GUI profile may include adjusting the display in accordance with the at least one of the contrast level value, the brightness level value, and the gamut level value associated with the second GUI profile.

In one or more embodiments, the one or more systems, the one or more methods, and/or the one or more processes may further, after determining that the event is associated with the second GUI profile, provide, by the first information handling system, configuration information to an I/O routing device, which is communicatively coupled to the display and the first information handling system, that indicates that a second information handling system communicatively coupled to the I/O routing device is to utilize the display. For example, displaying the second multiple GUIs via the second multiple GUI zones of the second GUI profile includes displaying, by the second information handling system via the display, the second multiple GUIs via the second multiple GUI zones of the second GUI profile.

In one or more embodiments, the one or more systems, the one or more methods, and/or the one or more processes, before determining that the event is associated with the second GUI profile, may further: receive, by the I/O routing device, fifth user input via at least one of a keyboard communicatively coupled to the I/O routing device and a pointing device communicatively coupled to the I/O routing device; and provide, by the I/O routing device, the fifth user input to the first information handling system.

In one or more embodiments, the one or more systems, the one or more methods, and/or the one or more processes may further: receive, by the I/O routing device, the configuration information from the first information handling system; and after the receiving the configuration information from the first information handling system, receive, by the I/O routing device, sixth user input via the at least one of the keyboard communicatively coupled to the I/O routing device and the pointing device communicatively coupled to the I/O routing device. In one or more embodiments, the one or more systems, the one or more methods, and/or the one or more processes may further provide, by the I/O routing device, the sixth user input to the second information handling system. In one or more embodiments, the event may be associated with a physical location. For example, determining that the event has occurred may include determining that a present physical location matches the physical location.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 3A illustrates an example of an I/O routing device, according to one or more embodiments;

FIG. 3B illustrates an example of a display that includes an I/O routing device, according to one or more embodiments;

FIG. 3C illustrates an example of multiple information handling systems coupled to an I/O routing device, according to one or more embodiments

DETAILED DESCRIPTION

Figure 1:
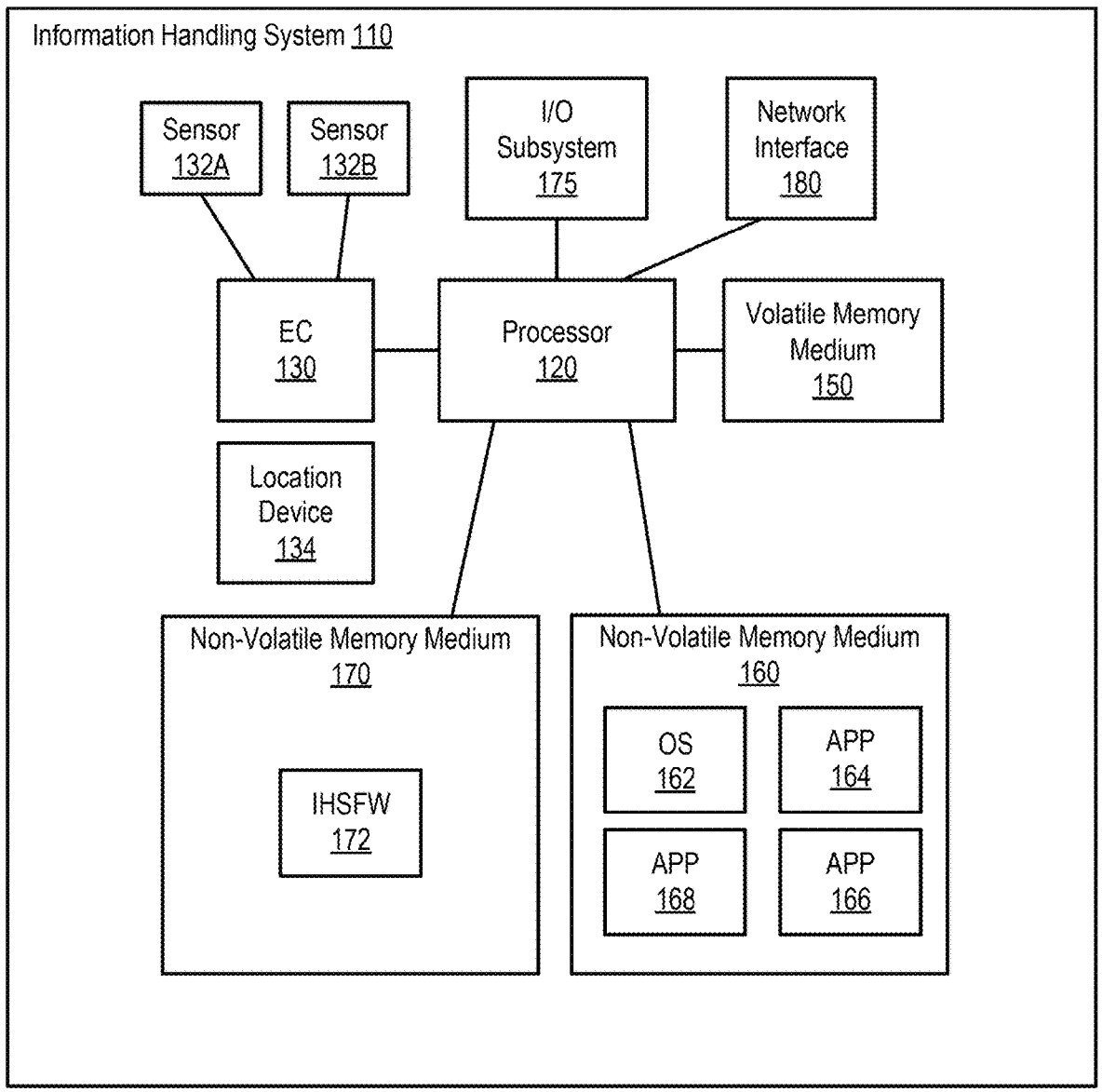
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a user may utilize multiple applications with their open windows at any given point in time, and screen real estate may be finite. For example, open windows (e.g., graphical user interfaces) may overlap from time-to-time, etc. In one or more embodiments, information handling system utilization may vary. In one example, a user may utilize an information handling system in a collaborative mode. For instance, the user may utilize the information handling system to attend a virtual meeting (e.g., a video conference), watch movies with others, play games with other, etc. In another example, a user may utilize an information handling system in an individual mode. For instance, the user may utilize the information handling system to write a document, create a drawing, create a picture, write an email, design machinery, write software, write firmware, etc. In one or more embodiments, managing applications and settings may be complex, and users may configure their information handling systems one time or utilize an operating system. For example, this may compromise on one or more experiences for the users. For instance, the operating system may not provide a decent front of display experience to the users.

In one or more embodiments, after the operating system starts, a user may launch applications one by one. For example, the operating system may position windows associated with the applications at random locations on a display. For instance, the user may move the windows associated with the applications to desired location each time after starting the operating system and/or each time after launching the applications. In one or more embodiments, the user may need to change settings based at least on an application, context, etc. For example, the settings may include one or more of brightness, contrast, and volume, among others. In one or more embodiments, after an application is exited or after an operating system reboots, a user may need to repeat one or more processes above. In one example, after a user powers up an information handling system, the user may need to launch Outlook, Skype, etc., organize associated windows manually, adjust a speaker volume, adjust a microphone gain, etc. In another example, at an end of a day, the user may desire to watch a movie via streaming video, and the user may minimize the windows associated with applications executing, launch a browser application, choose a network location of the movie for streaming video, adjust a volume of speakers, configure the speakers for surround sound, and/or set lighting to a cinema mode.

In one or more embodiments, an application may provide a user with a way to configure applications, window layouts, etc. into virtual desktops. For example, the virtual desktops may include one or more of a theater desktop, a software development desktop, a computer aided design desktop, a photo editing desktop, and a work desktop, among others. For instance, one or more setting associated with the one or more virtual desktops may include one or more of audio settings, video settings, and front of screen controls, among others. In one or more embodiments, scheduling may be applied to a workspace. For example, a schedule may be manual or may be automated based at least on behavior learning and/or crowd sourcing, among others.

In one or more embodiments, two or more desktops may be respectively associated with two or more displays. In one or more embodiments, a layout editor may permit flexible window placement. For example, zone boundaries of widows may overlap. In one or more embodiments, a service that executes on an information handling system may detect events. For example, the service may detect a calendar event, which may trigger an auto switch into a videoconference mode. In one or more embodiments, the service may start a workday with an office mode and may start a night and/or a weekend with home mode.

In one or more embodiments, the service may support an input/output (I/O) routing device setup. For example, the I/O routing device may include one or more structures and/or one or more functionalities of a KVM (keyboard/video/mouse) switch. In one or more embodiments, multiple instances of the service may be executed by multiple information handling systems. For example, the multiple instances of the service may orchestrate switching utilizing the I/O routing device. In one instance, the multiple instances of the service may configure an I/O routing device to utilize a first information handling system (e.g., a "work" information handling system) during working hours on a workday. In another instance, the multiple instances of the service may configure the I/O routing device to utilize a second information handling system (e.g., a "personal" or "home" information handling system) during nights and/or weekends. In one or more embodiments, the I/O routing device may direct input/output associated with the first information handling system and the second information handling system to a set of user I/O devices. For example, the set of user I/O devices may include a keyboard, a pointing device (e.g., a mouse, a touchpad, etc.), a video camera, and/or one or more displays, among others.

In one or more embodiments, one or more devices external to an information handling system may include one or more KVM features, which may permit the one or more devices to be utilized with multiple information handling systems without a KVM switch. In one example, a display may be coupled to multiple information handling systems. For instance, the display may receive input that indicates a selection of one of the multiple information handling systems from which to receive display information. In another example, a wireless device (e.g., an I/O routing device that include a Bluetooth transceiver) may be coupled to multiple information handling systems. For instance, the wireless device may provide information that indicates user input to one of the multiple information handling systems. As an example, the wireless device may be paired with the multiple information handling systems. For instance, the wireless device may provide information that indicates user input to the multiple information handling systems, and one of the multiple information handling systems may process the information that indicates the user input as the user input. As a second example, the wireless device may be paired with a first information handling system of the multiple information handling systems, and may provide information that indicates user input to the first information handling system. As another example, the wireless device may be receive a command to pair with a second information handling system of the multiple information handling systems, and may provide information that indicates user input to the second information handling system.

In one or more embodiments, one or more wireless peripherals may be paired with a display that is coupled to one or more information handling systems. For example, user input may be received from the one or more wireless peripherals via the display. For instance, the display may provide the user input to one of the one or more information handling systems. In one or more embodiments, one or more wireless peripherals may be paired with a display that is coupled to multiple information handling systems. In one example, first user input may be received from the one or more wireless peripherals via the display, and the display may provide the first user input to a first information handling system of the multiple information handling systems. In another example, second user input may be received from the one or more wireless peripherals via the display, and the display may provide the second user input to a second information handling system of the multiple information handling systems. For instance, the one or more wireless peripherals may be paired with the display to provide user input to the first information handling system of the multiple information handling systems without pairing or re-pairing the one or more wireless peripherals when the second information handling system is selected.

In one or more embodiments, one or more wired peripherals may be coupled to a display that is coupled to one or more information handling systems. For example, user input may be received from the one or more wired peripherals via the display. For instance, the display may provide the user input to one of the one or more information handling systems. In one or more embodiments, one or more wired peripherals may be coupled to a display that is coupled to multiple information handling systems. In one example, first user input may be received from the one or more wired peripherals via the display, and the display may provide the first user input to a first information handling system of the multiple information handling systems. In another example, second user input may be received from the one or more wired peripherals via the display, and the display may provide the second user input to a second information handling system of the multiple information handling systems. In one or more embodiments, the display may include an universal serial bus (USB) hub. For example, the one or more wired peripherals may be coupled to the USB hub of the display. In one instance, first user input may be received from the one or more wired peripherals via the display, and the display may provide the first user input to the first information handling system of the multiple information handling systems. In another instance, second user input may be received from the one or more wired peripherals via the display, and the display may provide the second user input to the second information handling system of the multiple information handling systems.

In one or more embodiments, one or more behaviors of one or more users may be learned over time. For example, an information handling system may learn when a user completes a workday. For instance, after the information handling system has learned when the user has completed a workday, the information handling system may switch to an entertainment profile. As an example, an entertainment profile may include a gaming profile, where the user may play and/or participate in a video game. As another example, an entertainment profile may include a theatre mode. For instance, the theatre mode may configure a brightness level of a display to show a movie (or other stored or streaming media) and/or may configure an audio system for the movie (or other stored or streaming media). In one or more embodiments, one or more behaviors may be learned from a single user. In one or more embodiments, behaviors may be learned from multiple users.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, a mobile IHS 110 may be a portable IHS 110. For example, IHS 110 may be a mobile IHS 110

In one or more embodiments, components of IHS 110 may include one or more storage devices, one or more communications ports for communicating with external devices as well as various I/O devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, an USB, a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an embedded controller (EC) 130, a volatile memory medium 150, non-volatile memory media 160 and 170, an I/O subsystem 175, and a network interface 180. As illustrated, EC 130, volatile memory medium 150, non-volatile memory media 160 and 170, I/O subsystem 175, and network interface 180 may be communicatively coupled to processor 120. In one or more embodiments, one or more of EC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of EC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of EC 130, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, IHS 110 may include one or more sensors. As illustrated, IHS 110 may include sensors 132A and 132B. Although sensors 132A and 132B are illustrated, IHS 110 may include any number of sensors 132, according to one or more embodiments. In one or more embodiments, a sensor 132 may include a temperature sensor. In one example, a sensor 132 may provide an analog signal associated with a temperature at or close to (e.g., within ten millimeters) sensor 132. In one instance, sensor 132 may provide an analog signal via an electrical current signal associated with a temperature at or close to sensor 132. In a second instance, sensor 132 may provide an analog signal via an electrical voltage signal associated with a temperature at or close to sensor 132. In another example, a sensor 132 may provide a digital signal associated with a temperature at or close to (e.g., within ten millimeters) sensor 132. For instance, sensor 132 may provide digital data associated with a temperature at or close to sensor 132. In a third example, a sensor 132 may provide an analog signal associated with a temperature at or close to (e.g., within ten millimeters) IHS 110. In one instance, sensor 132 may provide an analog signal via an electrical current signal associated with a temperature at or close to IHS 110. In a second instance, sensor 132 may provide an analog signal via an electrical voltage signal associated with a temperature at or close to IHS 110. In another example, a sensor 132 may provide a digital signal associated with a temperature at or close to (e.g., within ten millimeters) IHS 110. For instance, sensor 132 may provide digital data associated with a temperature at or close to IHS 110.

In one or more embodiments, a sensor 132 may be coupled to EC 130. In one or more embodiments, a sensor 132 may be physically located within a chassis (e.g., a housing) of IHS 110. In one example, sensor 132 may be utilized to determine a temperature value. In a second example, sensor 132 may be utilized to determine a light level value. In a third example, sensor 132 may be utilized to determine one or more movements. For instance, sensor 132 may include an accelerometer. In another example, sensor 132 may be utilized to determine one or more volume levels (e.g., one or more sound pressure levels). For instance, sensor 132 may include an audio input device (e.g., a microphone, etc.).

In one or more embodiments, IHS 110 may include a location device 134. In one example, location device 134 may be communicatively coupled to EC 130. In another example, location device 134 may be communicatively coupled to processor 120. In one or more embodiments, location device 134 may be utilized in determining a physical location of IHS 110. For example, location device 134 may receive one or more wireless signals, which may be utilized to determine the physical location of IHS 110. In one instance, the one or more wireless signals may include physical location information (e.g., "Meeting Room Bravo", "Cafeteria", etc.). In a second instance, location device 134 may determine signal strength measurements associated with the one or more wireless signals to determine the physical location of IHS 110. In another instance, the one or more wireless signals may include one or more ranging signals (e.g., one or more ranging signals from a global positioning system, one or more ranging signals from a constellation of transmitters like those of a global positioning system, etc.). In one or more embodiments, location device 134 may a global positioning system (GPS) receiver device, which may determine the physical location of IHS 110.

In one or more embodiments, location device 134 may include a wireless signal receiver and a processor that executes instructions from a memory medium. For example, the processor of location device 134 may executes instructions in accordance with at least a portion of one or more of systems, at least a portion of one or more flowcharts, at least a portion of one or more methods, and/or at least a portion of one or more processes described herein. In one or more embodiments, location device 134 may include a wireless signal receiver and one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a FPGA and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2A:
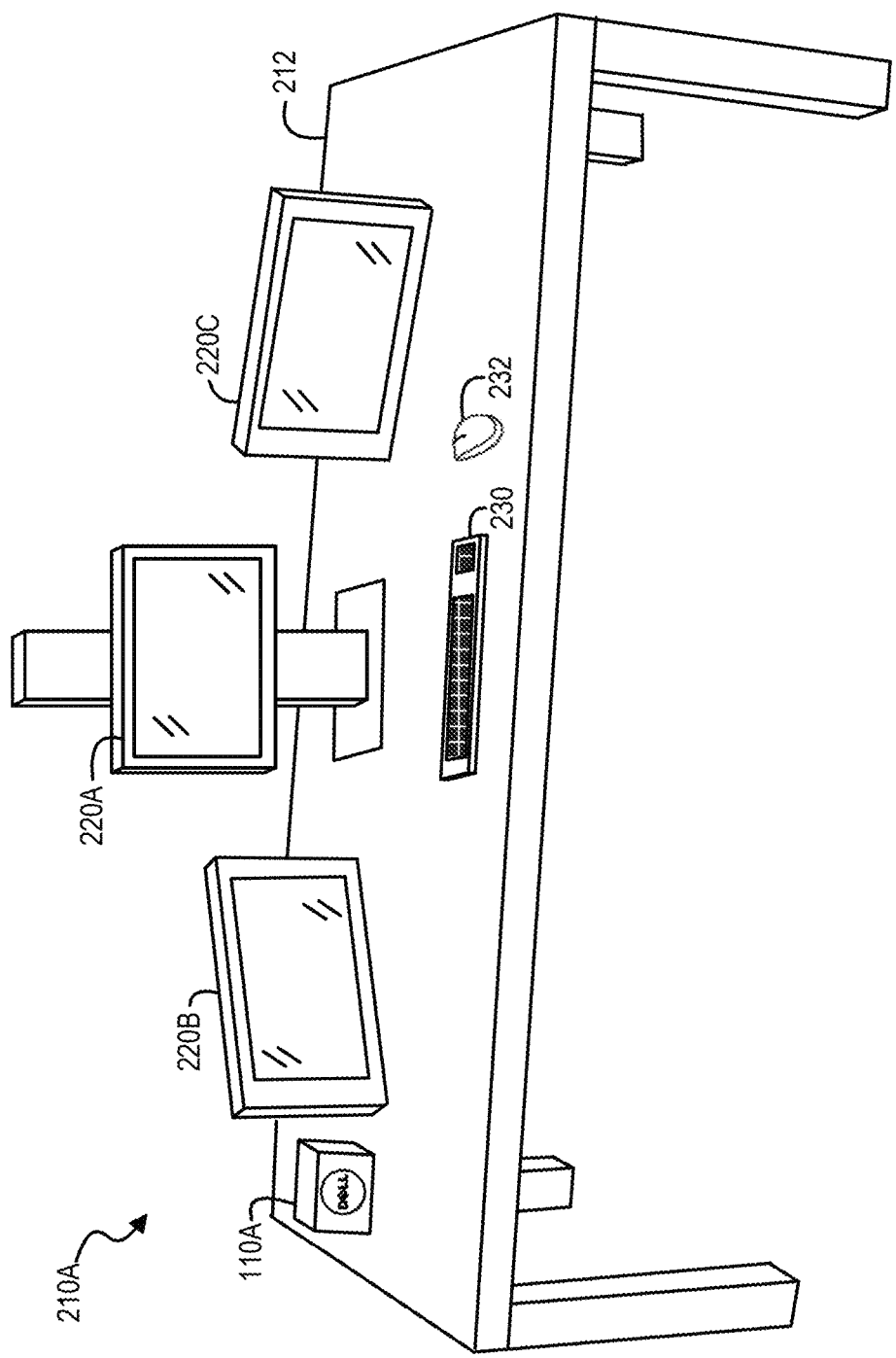
FIG. 2A illustrates an example of a system, according to one or more embodiments.

Turning now to FIG. 2A, an example of a system is illustrated, according to one or more embodiments. In one or more embodiments, a system may include an information handling system and one or more displays, among others. As illustrated, a system 210A may include an IHS 110A and displays 220A-220C. For example, displays 220A-220C may be communicatively coupled to IHS 110A. In one instance, one or more of displays 220A-220C may be communicatively coupled to IHS 110A in a wired fashion. In another instance, one or more of displays 220A-220C may be communicatively coupled to IHS 110A in a wireless fashion.

In one or more embodiments, system 210A may include one or more peripherals. As shown, system 210A may include a keyboard 230 and a mouse 232 (e.g., a pointing device, a cursor device, etc.). In one or more embodiments, one or more of the one or more peripherals of system 210A may be communicatively coupled to IHS 110A. In one example, one or more of the one or more peripherals of system 210A may be communicatively coupled to IHS 110A in a wired fashion. For instance, one or more of keyboard 230 and mouse 232 may be communicatively coupled to IHS 110A in a wired fashion. In another example, one or more of the one or more peripherals of system 210A may be communicatively coupled to IHS 110A in a wireless fashion. For instance, one or more of keyboard 230 and mouse 232 may be communicatively coupled to IHS 110A in a wireless fashion. In one or more embodiments, one or more of IHS 110A, displays 220A-220C, keyboard 230, and mouse 232, among others, may lie on a desk 212.

Figure 2B:
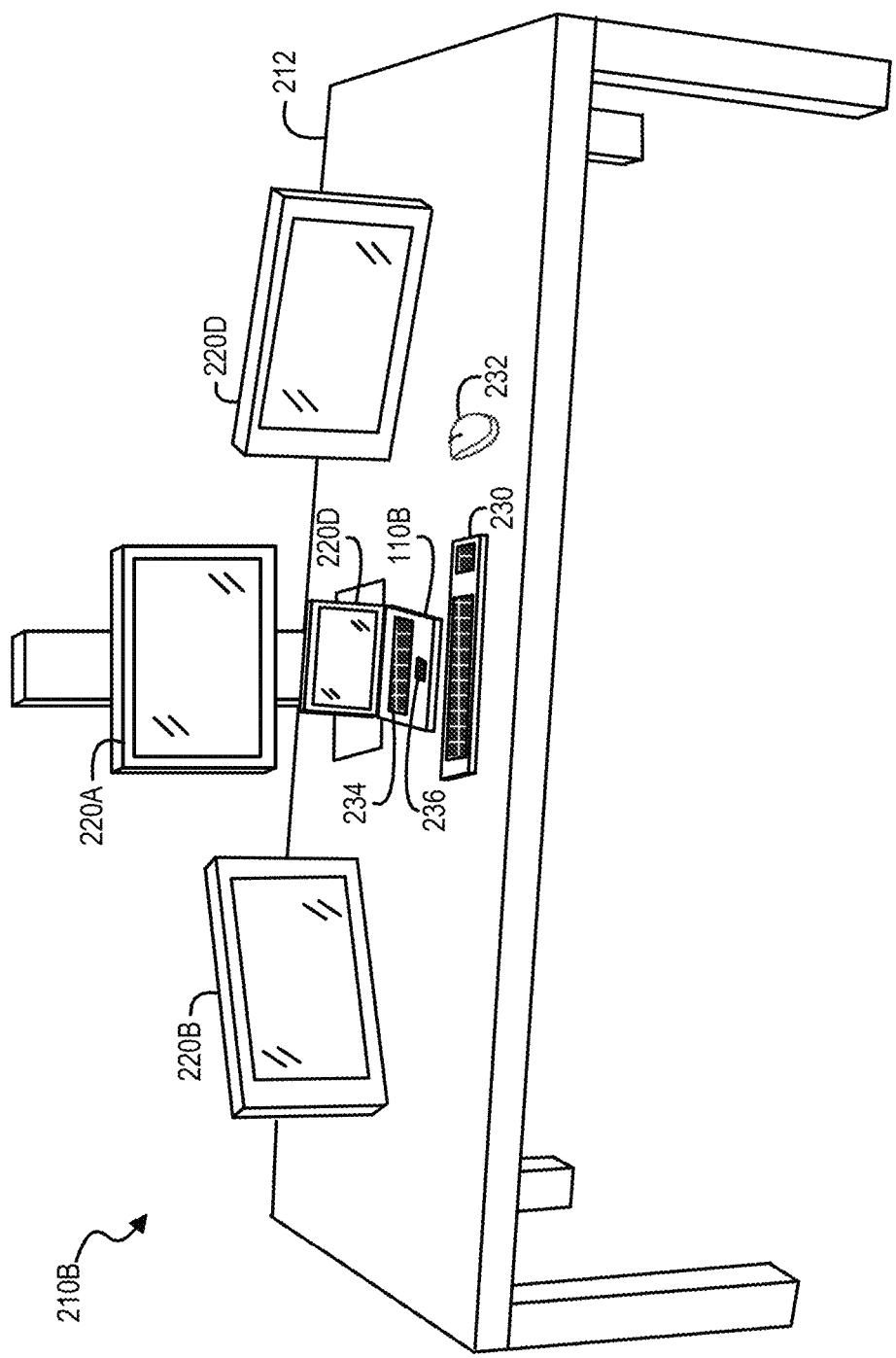
FIG. 2B illustrates a second example of a system, according to one or more embodiments.

Turning now to FIG. 2B, a second example of a system is illustrated, according to one or more embodiments. As shown, a system 210B may include an IHS 110B and displays 220A-220C. For example, displays 220A-220C may be communicatively coupled to IHS 110B. In one instance, one or more of displays 220A-220C may be communicatively coupled to IHS 110B in a wired fashion. In another instance, one or more of displays 220A-220C may be communicatively coupled to IHS 110B in a wireless fashion.

In one or more embodiments, system 210B may include one or more peripherals. As shown, system 210B may include a keyboard 230 and a mouse 232. In one or more embodiments, one or more of the one or more peripherals of system 210B may be communicatively coupled to IHS 110B. In one example, one or more of the one or more peripherals of system 210B may be communicatively coupled to IHS 110B in a wired fashion. For instance, one or more of keyboard 230 and mouse 232 may be communicatively coupled to IHS 110B in a wired fashion. In another example, one or more of the one or more peripherals of system 210B may be communicatively coupled to IHS 110B in a wireless fashion. For instance, one or more of keyboard 230 and mouse 232 may be communicatively coupled to IHS 110B in a wireless fashion.

In one or more embodiments, IHS 110B may include one or more displays and/or one or more input devices. In one example, IHS 110B may include a display 220D. In a second example, IHS 110B may include a keyboard 234. In another example, IHS 110B may include a touchpad 236 (e.g., a pointing device, a cursor device, etc.). In one or more embodiments, one or more of IHS 110B, displays 220A-220C, keyboard 230, and mouse 232, among others, may lie on desk 212.

Figure 2C:
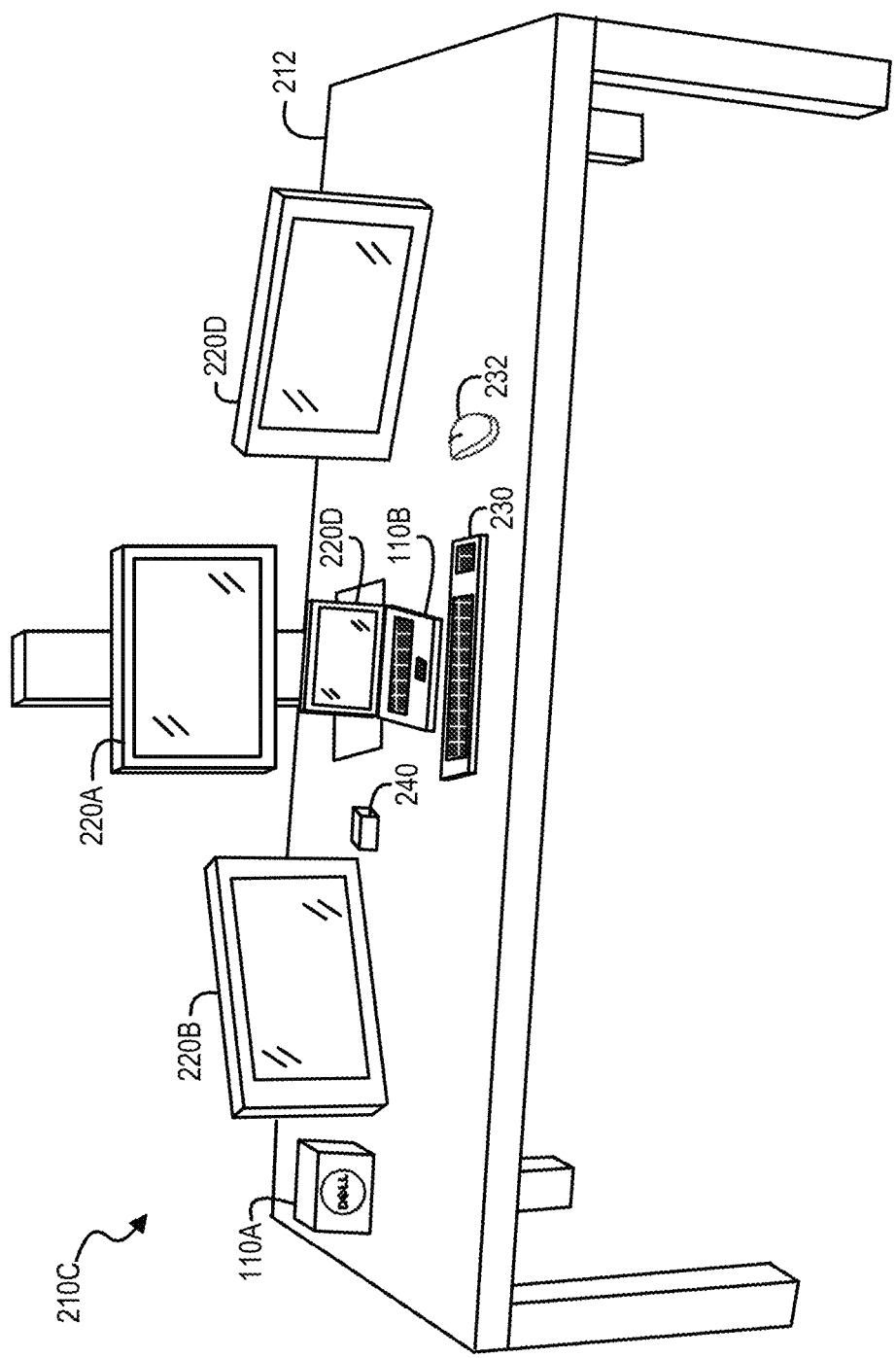
FIG. 2C illustrates another example of a system, according to one or more embodiments.

Turning now to FIG. 2C, another example of a system is illustrated, according to one or more embodiments. In one or more embodiments, a system may include multiple information handling systems, an and I/O routing device, and one or more displays, among others. As illustrated, a system 210C may include elements from system 210A and elements from 210B, among others. In one or more embodiments, system 210C may include an I/O routing device 240. For example, I/O routing device 240 may be communicatively coupled to IHS 110A and IHS 110B. In one instance, I/O routing device 240 may be communicatively coupled to IHS 110A in a wired fashion. In a second instance, I/O routing device 240 may be communicatively coupled to IHS 110A in a wireless fashion. In a third instance, I/O routing device 240 may be communicatively coupled to IHS 110B in a wired fashion. In another instance, I/O routing device 240 may be communicatively coupled to IHS 110B in a wireless fashion.

In one or more embodiments, I/O routing device 240 may be communicatively coupled to the one or more displays of system 210C and/or may be communicatively coupled to the one or more peripherals of system 210C. For example, I/O routing device 240 may be communicatively coupled to one or more of displays 220A-220C and/or may be communicatively coupled to one or more of keyboard 230 and mouse 232, among others. In one instance, I/O routing device 240 may be communicatively coupled to one or more of displays 220A-220C in a wired fashion and/or may be communicatively coupled to one or more of keyboard 230 and mouse 232, among others, in a wired fashion. In another instance, I/O routing device 240 may be communicatively coupled to one or more of displays 220A-220C in a wireless fashion and/or may be communicatively coupled to one or more of keyboard 230 and mouse 232, among others, in a wireless fashion. In one or more embodiments, I/O routing device 240 may communicatively couple IHS 110A to one or more of displays 220A-220C and/or may communicatively couple IHS 110A to one or more of keyboard 230 and mouse 232, among others. In one or more embodiments, I/O routing device 240 may communicatively couple IHS 110B to one or more of displays 220A-220C and/or may communicatively couple IHS 110B to one or more of keyboard 230 and mouse 232, among others.

In one or more embodiments, I/O routing device 240 may configured to communicatively couple either IHS 110A or IHS 110B to one or more of displays 220A-220C and/or may communicatively couple IHS 110A to one or more of keyboard 230 and mouse 232, among others. For example, I/O routing device 240 may receive input that indicates which of IHS 110A and IHS 110B to communicatively couple to one or more of displays 220A-220C and/or to one or more of keyboard 230 and mouse 232, among others. In one instance, I/O routing device 240 may receive first input, and in response to the first input, I/O routing device 240 may communicatively couple IHS 110A to one or more of displays 220A-220C and/or to one or more of keyboard 230 and mouse 232, among others. In another instance, I/O routing device 240 may receive second input, and in response to the second input, I/O routing device 240 may communicatively couple IHS 110B to one or more of displays 220A-220C and/or to one or more of keyboard 230 and mouse 232, among others. In one or more embodiments, one or more of the first input received by I/O routing device 240 and the second input received by I/O routing device 240, among others, may include manual input. For example, the one or more of the first input received by I/O routing device 240 and the second input received by I/O routing device 240, among others, may be manually received from a user. In one or more embodiments, the one or more of the first input received by I/O routing device 240 and the second input received by I/O routing device 240, among others, may include configuration information from an IHS 110. In one example, the configuration information may be received from IHS 110A. In another example, the configuration information may be received from IHS 110B. In one or more embodiments, one or more of IHS 110B, displays 220A-220C, keyboard 230, and mouse 232, I/O routing device 240, among others, may lie on desk 212.

Figure 2D:
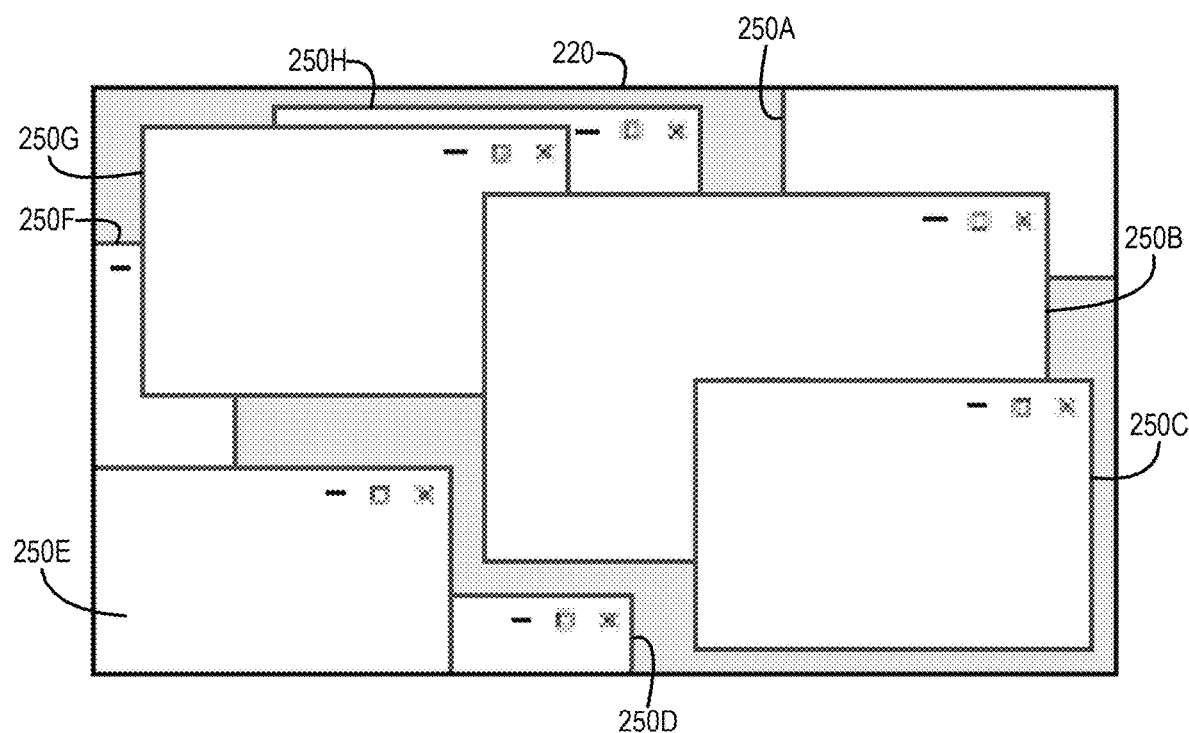
FIG. 2D illustrates an example of a display that displays graphical user interfaces, according to one or more embodiments.

Turning now to FIG. 2D, an example of a display that displays graphical user interfaces is illustrated, according to one or more embodiments. In one or more embodiments, a display 220 may display at least a portion of each of one or more graphical user interfaces (GUIs). For example, a graphical user interface (GUI) may be or include a window. For instance, a GUI may be utilized in I/O operations of an application. As an example, an application may utilize a GUI to provide output to a user. As another example, an application may utilize a GUI to receive input from a user. As illustrated, display 220 may display a portion of each of GUIs 250A, 250B, and 250C-250H. As shown, display 220 may display GUI 250C in its entirety. As illustrated, GUI 250D may overlap GUI 250B. As shown, GUI 250B may overlap GUIs 250A, 250G, and 250H. As illustrated, GUI 250E may overlap GUIs 250D, and 250F. As shown, GUI 250G may overlap GUIs 250F and 250H.

Figure 2E:
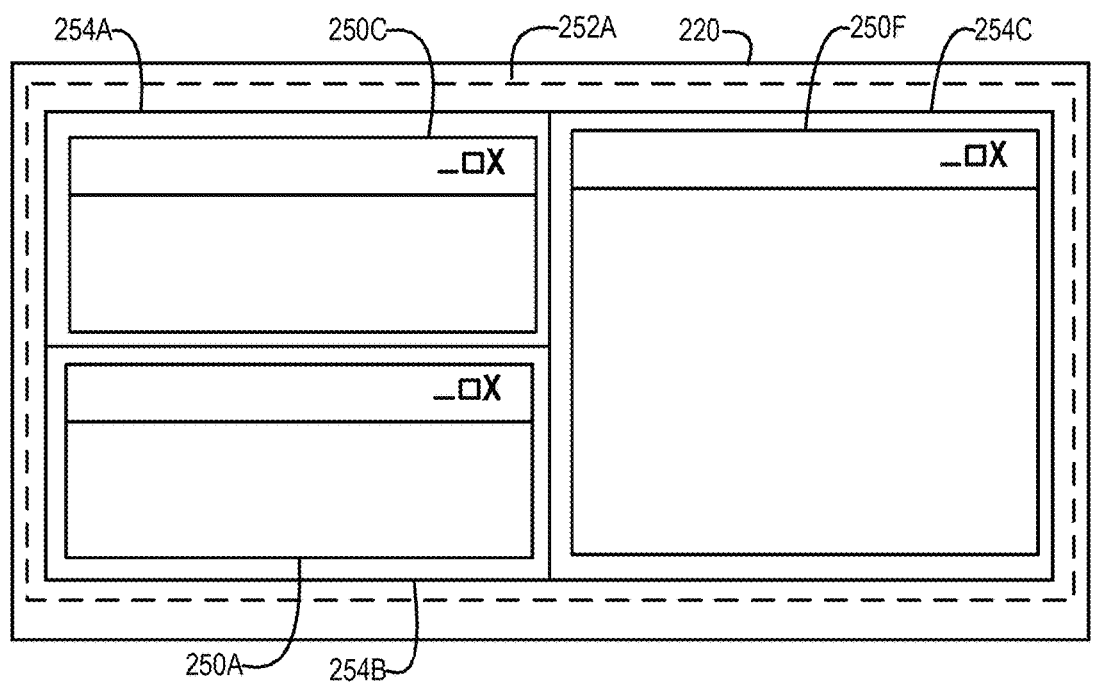
FIG. 2E illustrates an example of graphical user interface zones utilized to organize graphical user interfaces, according to one or more embodiments.

Turning now to FIG. 2E, an example of graphical user interface zones utilized to organize graphical user interfaces is illustrated, according to one or more embodiments. In one or more embodiments, a profile may be utilized to organize multiple GUIs. For example, a GUI profile may include multiple GUI zones that may respectively display multiple GUIs. For instance, a GUI zone may be associated with a portion of a display 220. As illustrated, a GUI profile 252A may include GUI zones 254A-254C. For example, GUI zones 254A-254C may be utilized to organize GUIs 254A, 254C, and 254F. For instance, GUI zones 254A-254C may be utilized to respectively display GUIs 254C, 254A, and 254F.

Figure 2F:
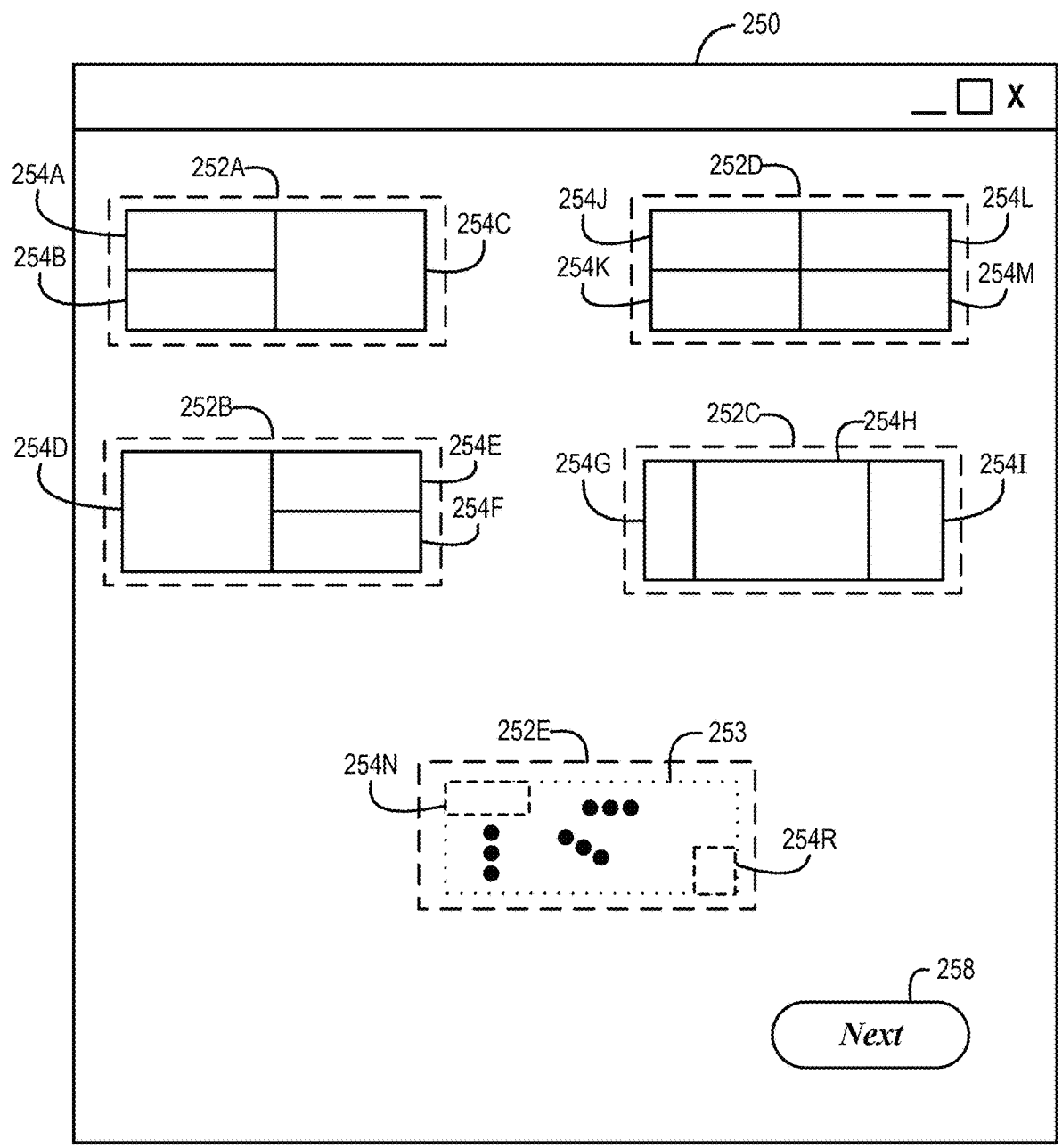
FIG. 2F illustrates an example of a graphical user interface utilized to organize graphical user interfaces, according to one or more embodiments.

Turning now to FIG. 2F, an example of a graphical user interface utilized to organize graphical user interfaces is illustrated, according to one or more embodiments. In one or more embodiments, a GUI 254 may display possible GUI profiles 254A-254E, which a user may select. In one or more embodiments, user input may be received, which may indicate a GUI profile to display multiple GUIs. In one example, a GUI profile to display multiple GUIs may be configured for the user. For instance, GUI profiles 252A-252D may be configured for the user. In another example, the user may configure a GUI profile. For instance, the user may configure a GUI profile 252E. As illustrated, GUI profile 252A may include zones 254A-54C. As shown, GUI profile 252B may include GUI zones 254D-54F. As illustrated, GUI profile 252C may include GUI zones 254G-54I. As shown, GUI profile 252D may include GUI zones 254J-54M. In one or more embodiments, a GUI profile 252 may include any number of GUI zones 254.

In one or more embodiments, the user may configure GUI profile 252E with any number of GUI zones 254. For example, the user may configure GUI profile 252E with GUI zones 254N-254R. For instance, the user may configure GUI profile 252E with GUI zones 254N-254R at various location associated with GUI profile 252E. In one or more embodiments, the user may actuate an icon 258, which may permit the user to proceed in configuring a GUI zone 254.

Figure 2G:
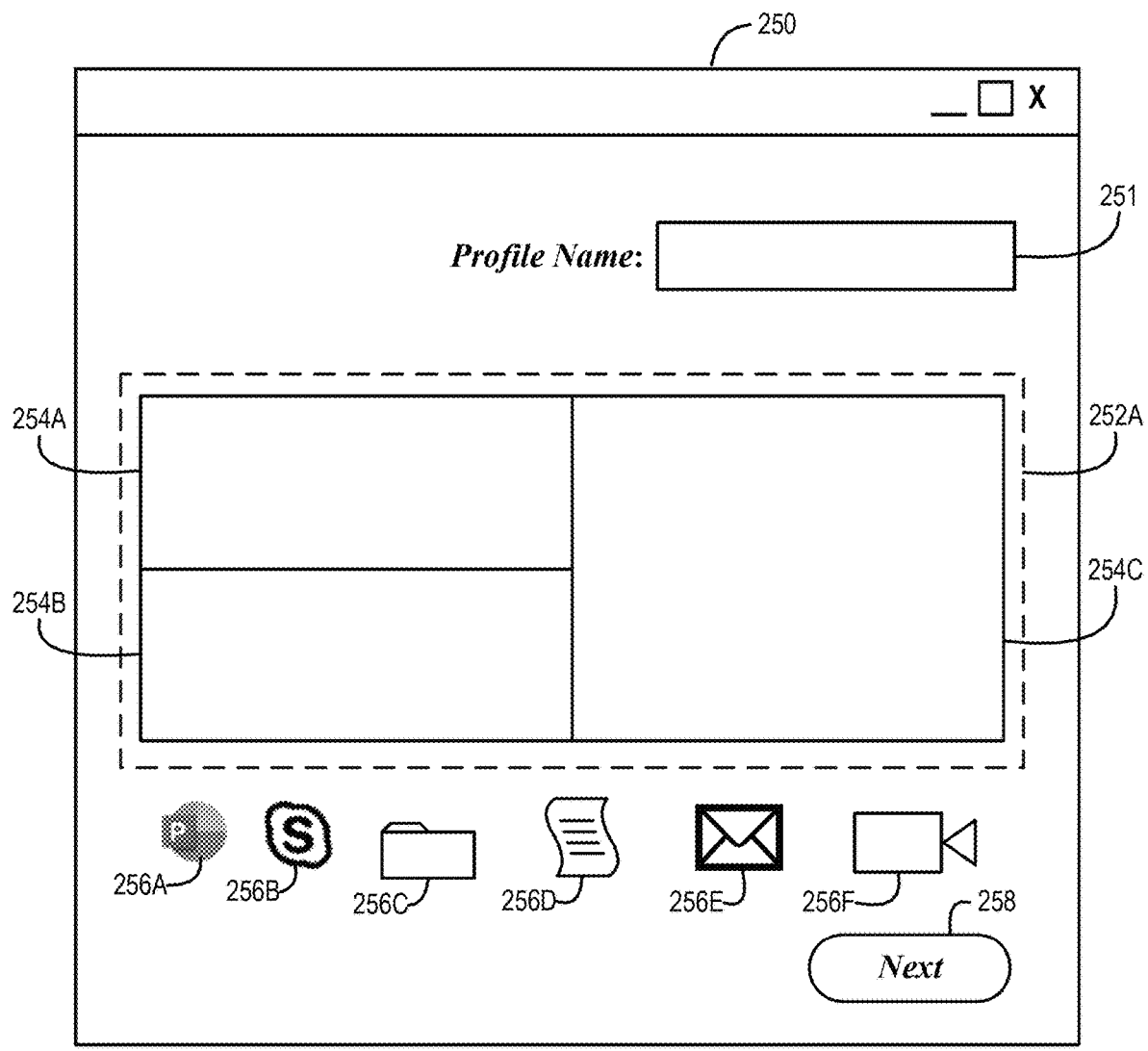
FIG. 2G illustrates a second example of a graphical user interface utilized to organize graphical user interfaces, according to one or more embodiments.

Turning now to FIG. 2G, a second example of a graphical user interface utilized to organize graphical user interfaces is illustrated, according to one or more embodiments. In one or more embodiments, a user may associate one or more characters (e.g., text, a name, etc.) with a GUI profile 252. For example, GUI 250 may include an input area 251, where a user may enter one or more characters that may be associated with a GUI profile 252. In one or more embodiments, a user may select an icon associated with an application and a GUI zone 254. For example, the user may select an icon of icons 256A-256F associated with respective applications and drag and drop the icon in a zone of zones 254A-254C. For instance, icons 256A-256F may be respectively associated a PowerPoint application, a Skype application, a file browser application, a word processing application, an email application, and a video editing application.

In one or more embodiments, an icon 256 may represent a GUI of an application. In one example, when the user drags and drops icon 256B to GUI zone 254A, a GUI of the Skype application may be displayed via GUI zone 254A. In a second example, when the user drags and drops icon 256E to GUI zone 254B, a GUI of the email application may be displayed via GUI zone 254B. In another example, when the user drags and drops icon 256D to GUI zone 254C, a GUI of the word processing application may be displayed via GUI zone 254C. In one or more embodiments, there may be a one-to-one association of icons to GUI zones. For example, once a selected icon 256 is associated with a first GUI zone 254, the selected icon 256 may not be utilized with a second GUI zone 254. In one or more embodiments, there may not be a one-to-one association of icons to GUI zones. For example, a selected icon 256 is associated with a first GUI zone 254 may also be associated with a second GUI zone 254. For instance, two documents may be displayed via two GUIs of the word processing application. As an example, the two GUIs of the word processing application may be displayed via two respective GUI zones 254. In one or more embodiments, the user may actuate icon 258, which may permit the user to proceed in configuring a GUI zone 254 and/or a GUI profile 252.

Figure 2H:
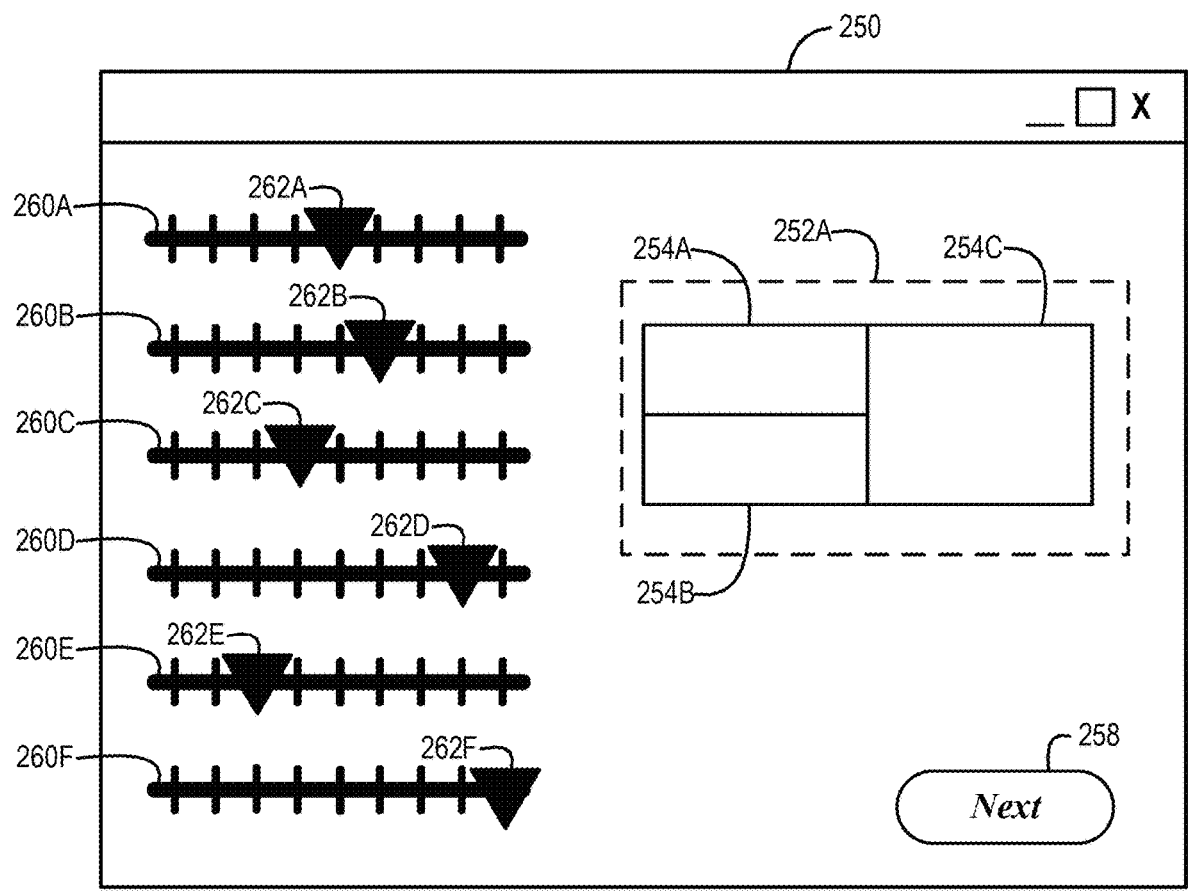
FIG. 2H illustrates a third example of a graphical user interface utilized to organize graphical user interfaces, according to one or more embodiments.

Turning now to FIG. 2H, a third example of a graphical user interface utilized to organize graphical user interfaces is illustrated, according to one or more embodiments. In one or more embodiments, a user may configure one or more attributes associated with a GUI profile 252. For example, one or more of GUI elements 260A-260F and one or more of respective slider input elements 262A-262F may be utilized to configure the one or more attributes associated with GUI profile 252A. In one instance, GUI elements 260A-260C may be utilized to respectively configure red, green, and blue attributes associated with GUI profile 252A. In a second instance, GUI element 260D may be utilized to configure a brightness attribute associated with GUI profile 252A. In a third instance, GUI element 260E may be utilized to configure a contrast attribute associated with GUI profile 252A. In another instance, GUI element 260F may be utilized to configure volume level (e.g., a sound pressure level) associated with GUI profile 252A.

In one or more embodiments, a user may configure one or more attributes associated with a GUI zone 254. For example, one or more of GUI elements 260A-260F may be utilized to configure the one or more attributes associated with GUI zone 254C. In one instance, GUI elements 260A-260C may be utilized to respectively configure red, green, and blue attributes associated with GUI zone 254C. In a second instance, GUI element 260D may be utilized to configure a brightness attribute associated with GUI zone 254C. In a third instance, GUI element 260E may be utilized to configure a contrast attribute associated with GUI zone 254C. In another instance, GUI element 260F may be utilized to configure volume level (e.g., a sound pressure level) associated with GUI zone 254C. In one or more embodiments, the user may actuate icon 258, which may permit the user to proceed in configuring a GUI zone 254 and/or a GUI profile 252.

Figure 2I:
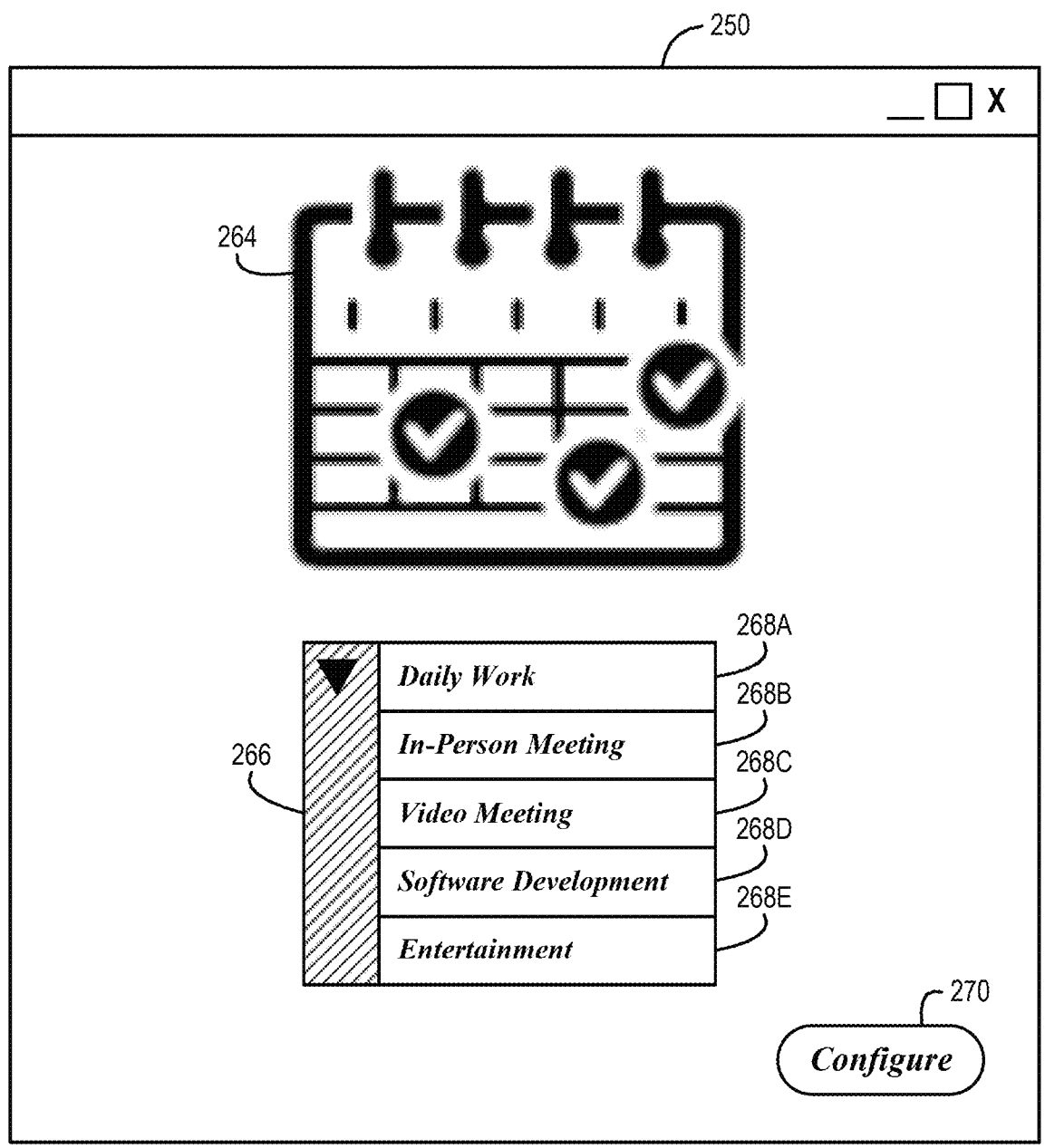
FIG. 2I illustrates a fourth example of a graphical user interface utilized to organize graphical user interfaces, according to one or more embodiments.

Turning now to FIG. 2I, a fourth example of a graphical user interface utilized to organize graphical user interfaces is illustrated, according to one or more embodiments. In one or more embodiments, a GUI profile 252 may be associated with an event. In one example, an event may include a calendar event. In one instance, the calendar event may be associated with a specific date and time. In another instance, the calendar event may be associated with a time (e.g., the time may occur daily, on specific days of a week, on specific days of a month, etc.). In another example, an event may include a location event. In one instance, the location event may occur when IHS 110 is at or within a distance of a physical location. In a second instance, the location event may occur when IHS 110 is at or within two or more position boundaries (e.g., within an area, within a building, outside the building, in a meeting room, outside a meeting room, etc.).

In one or more embodiments, the user may utilize a GUI element 264. For example, GUI element 264 may be associated with a calendar. For instance, the user may utilize GUI element 264 to set a calendar event. In one or more embodiments, the user may utilize a GUI element 266. For example, GUI element 264 may be associated with a drop-down menu. For instance, drop-down menu elements 268A-268E may be respectively associated with profiles 252A-252E. In one or more embodiments, drop-down menu element 268A may be associated with a daily work GUI profile. In one example, a string of characters "Daily Work" may have been entered via input element 251 and may have been associated with a daily work GUI profile 252. In another example, an event may occur at 8:00 A.M. every Monday through Friday, which may trigger the daily work GUI profile. For instance, IHS 110 may display, via a display 220, the daily work GUI profile at 8:00 A.M. every Monday through Friday.

In one or more embodiments, drop-down menu element 268B may be associated with an in-person meeting GUI profile. For example, a meeting event or a calendar event may occur at a time on a date. For instance, when a calendar event occurs at a time on a date, an in-person meeting profile may be triggered. In one or more embodiments, drop-down menu element 268B may be associated with an in-person meeting GUI profile. For example, an in-person meeting event or a calendar event may occur at a time on a date. For instance, when a calendar event occurs at a time on a date, IHS 110 may display, via a display 220, the in-person meeting GUI profile.

In one or more embodiments, drop-down menu element 268C may be associated with a video meeting GUI profile. For example, a meeting event or a calendar event may occur at a time on a date. For instance, when a calendar event occurs at a time on a date, a video meeting GUI profile may be triggered. In one or more embodiments, drop-down menu element 268C may be associated with a video meeting GUI profile. For example, a video meeting event or a calendar event may occur at a time on a date. For instance, when a calendar event occurs at a time on a date, IHS 110 may display, via a display 220, the video meeting GUI profile.

In one or more embodiments, drop-down menu element 268D may be associated with a software development GUI profile. In one example, an event may occur at 10:00 A.M. every Monday through Thursday. For instance, IHS 110 may display, via a display 220, the software development GUI profile at 10:00 A.M. every Monday through Thursday. In another example, the software development GUI profile may be selected manually. For instance, an event may be a user input event that selects the software development GUI profile. As an example, when the software development GUI profile is selected manually, IHS 110 may display, via a display 220, the software development GUI profile.

In one or more embodiments, drop-down menu element 268E may be associated with an entertainment GUI profile. For example, the entertainment GUI profile may be associated with displaying media from a streaming media service. In one instance, an event may occur at 5:00 P.M. every Monday through Friday. As an example, IHS 110 may display, via a display 220, the entertainment GUI profile at 5:00 P.M. every Monday through Thursday. In another instance, the entertainment GUI profile may be selected manually. As an example, when the entertainment profile is selected manually, IHS 110 may display, via a display 220, the entertainment GUI profile.

In one or more embodiments, a GUI profile 252 may be associated with an information handling system. For example, when the event occurs, an associated profile may be utilized with a specific information handling system. For instance, the user may be utilizing IHS 110B for work. As an example, I/O routing device 240 may communicatively couple one or more of displays 220A-220C, keyboard 230, and mouse 232 to IHS 110B. In one or more embodiments, when an event occurs at 5:00 P.M. every Monday through Friday, the entertainment GUI profile may be utilized with IHS 110A. For example, one or more of IHS 110A and IHS 110B may provide information (e.g., configuration information) to I/O routing device 240, and in response to the information, I/O routing device 240 may communicatively couple one or more of displays 220A-220C, keyboard 230, and mouse 232, among others, to IHS 110A.

In one or more embodiments, an information handling system may control I/O routing device 240. In one example, an information handling system (e.g., IHS 110A) may provide first configuration information to I/O routing device 240. For instance, the first configuration information may indicate that I/O routing device 240 is to utilize one or more of a display 220, keyboard 230, and mouse (e.g., a pointing device) with another information handling system (e.g., IHS 110B). In another example, the other information handling system (e.g., IHS 110B) may provide second configuration information to I/O routing device 240. For instance, the second configuration information may indicate that I/O routing device 240 is to utilize one or more of a display 220, keyboard 230, and mouse (e.g., a pointing device) with the other information handling system.

Figure 2J:
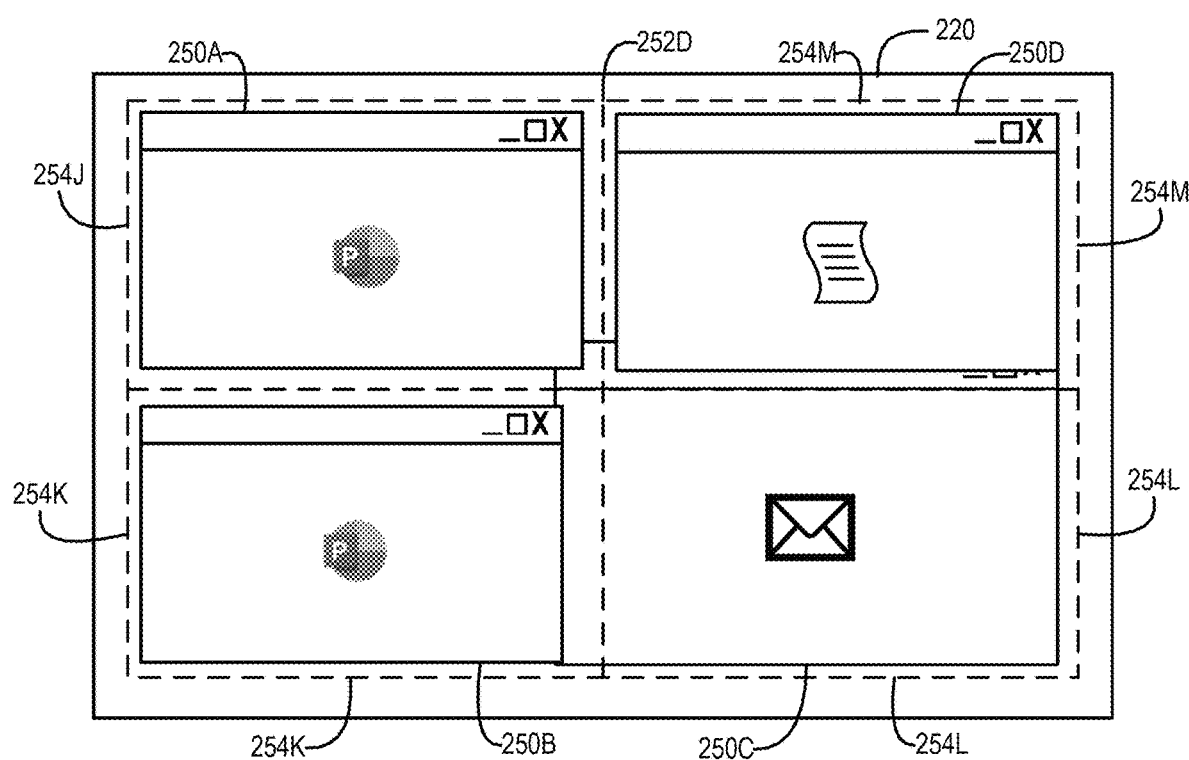
FIG. 2J illustrates an example of graphical user interfaces displayed via zones of a profile, according to one or more embodiments.

Turning now to FIG. 2J, an example of graphical user interfaces displayed via zones of a profile is illustrated, according to one or more embodiments. As shown, GUIs 250A, 250B, and 250D may be displayed via respective zones 254J, 254K, and 254M of GUI profile 252D. As illustrated, GUI 250C may be displayed via GUI zone 254L of GUI profile 252D and may not be within one or more boundaries of GUI zone 254L. For example, GUI 250C may extend past one or more boundaries of GUI zone 254L. For instance, GUI 250C may be overlapped by one or more GUIs 250. As shown, GUI 250C may be overlapped by GUIs 250A, 250B, and 250D. For example, one or more portions of GUI 250C may not be visible to a user. For instance, the one or more portions of GUI 250C that are not be visible to the user may not be needed or desired to be visible by the user. As an example, GUI 250C may be associated with an email application. For instance, the one or more portions of GUI 250C that are not be visible to the user may not be needed or desired to be visible by the user for the user to utilize the email application as GUI 250C is configured in FIG. 2J.

Figure 2L:
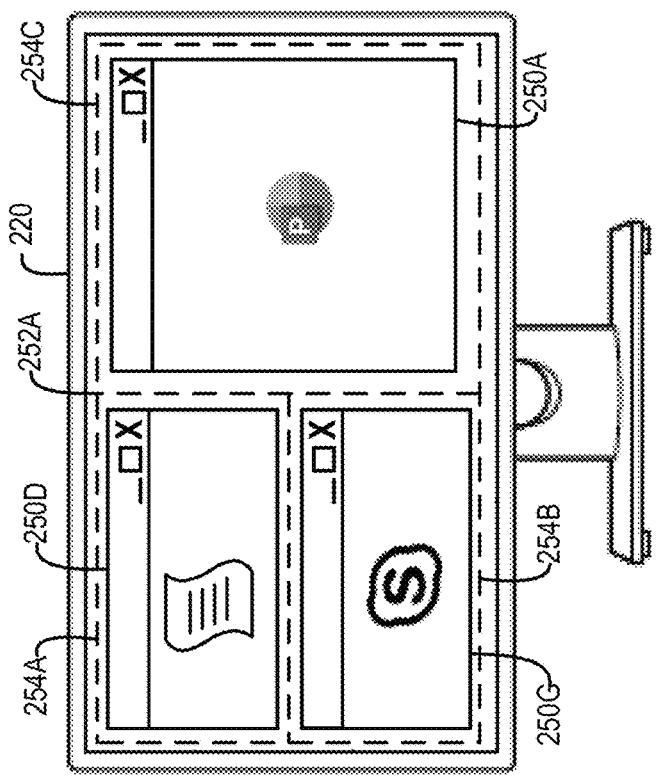
FIG. 2L illustrates an example of displaying a profile, according to one or more embodiments.
Figure 2K:
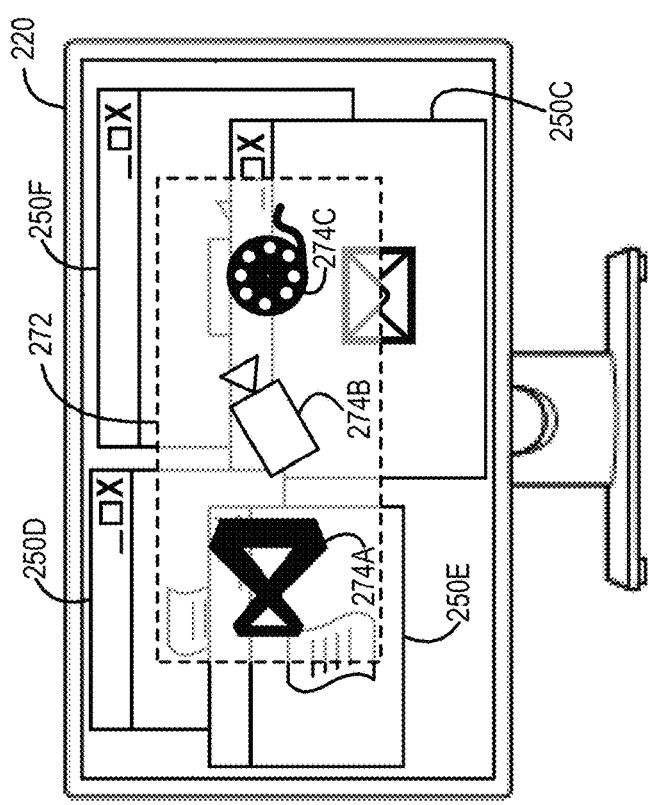
FIG. 2K illustrates an example of a profile pallet, according to one or more embodiments.

Turning now to FIG. 2K, an example of a profile pallet is illustrated, according to one or more embodiments. As shown, display 220 may display GUIs 250C-250F. In one or more embodiments, display 220 may display a GUI profile pallet 272. For example, GUI profile pallet 272 may include one or more profile icons. As illustrated, GUI profile pallet 272 may include GUI profile icons 274A-274C. In one example, GUI profile icon 274A may be associated with a software development GUI profile. In a second example, GUI profile icon 274B may be associated with a video meeting GUI profile. In another example, GUI profile icon 274C may be associated with an entertainment GUI profile.

In one or more embodiments, a user may manually select a GUI profile icon 274 from GUI profile pallet 272. For example, an event may be associated with receiving user input of the user selecting a GUI profile icon 274 from GUI profile pallet 272. In one or more embodiments, it may be determined that the event associated with receiving user input of the user selecting a GUI profile icon 274 from GUI profile pallet 272 has occurred. For example, it may be determined that that the event is associated with a GUI profile. For instance, display 220 may display the GUI profile associated with the event. As an example, an event may be associated with receiving user input of the user selecting GUI profile icon 274B from GUI profile pallet 272. For instance, display 220 may display GUI profile 252A, which may be associated with the event of the user selecting GUI profile icon 274B.

Turning now to FIG. 2L, an example of displaying a profile is illustrated, according to one or more embodiments. In one or more embodiments, a GUI profile 252 may be displayed in response to an event. In one example, display 220 may display GUI profile 252A when an event of a user manually selecting GUI profile icon 274B occurs. In another example, display 220 may display GUI profile 252A when an event of a present time and/or a present date (e.g., a time and/or a date that a clock of an information handling system has at present) matches a stored time and/or a stored date associated with an event. In one instance, the event may be a singular calendar event. In another instance, the event may be a recurring event (e.g., 8:00 A.M. every Monday through Friday, 11:27 A.M. on a second day of a month, every first Tuesday of November one a four year interval, etc.).

In one or more embodiments, an event may occur when it is determined that one or more criteria matches stored one or more criteria associated with the event. In one example, an event may occur when it is determined that a present time (e.g., a time that a clock of an information handling system has at present) matches a time associated with the event. In a second example, an event may occur when it is determined that a present time and a present date (e.g., a time and a date that a clock of an information handling system has at present) matches a time and a date associated with the event. In a third example, an event may occur when it is determined that a present time and a present date (e.g., a time and a date that a clock of an information handling system has at present) is past a time and a date associated with the event. In a fourth example, an event may occur when it is determined that one or more present sensor values matches one or more stored values associated with the event. For instance, the one or more present sensor values may be received from one or more of sensors 132A and 132B, among others. In a fifth example, an event may occur when it is determined that present physical location information matches stored physical location information associated with the event. For instance, the present physical location information may be received from location device 134. In another example, an event may occur when it is determined that present network information matches stored network information associated with the event.

In one or more embodiments, network information may include an IP address (e.g., an IP address associated with an IHS 110, an IP address associated with a router, an IP address associated with a name server, an IP address associated with a website, etc.), a media access control (MAC) address (e.g., a MAC address associated with an IHS 110, a MAC address associated with a router, a MAC address associated with a wireless access point, a MAC address associated with a network bridge, etc.), and a logical name address (e.g., www.dell.com, www.microsoft.com, etc.), among others.

In one or more embodiments, an event may occur when it is determined that one or more criteria does not match stored one or more criteria associated with the event. In one example, an event may occur when it is determined that present physical location information does not match stored physical location information associated with the event. In another example, an event may occur when it is determined that present network information does not match stored network information associated with the event.

In one or more embodiments, one or more criteria associated with an event may be learned. For example, a machine learning process may be utilized to learn one or more criteria associated with an event. In one or more embodiments, an unsupervised machine learning process, based at least on one or more behaviors associated with one or more users, may be utilized to learn one or more criteria associated with an event. For example, the machine learning process may determine associations between or among multiple behaviors associated with one or more users. For instance, the machine learning process may determine associations between or among multiple behaviors associated with a profile change, which may indicate an event.

In one or more embodiments, one or more learned criteria associated with a profile change may include one or more of a time of day, a date, a physical location, a temperature surrounding an information handling system, an amount of light around an information handling system, an ambient sound level surrounding an information handling system, a number of profile changes that occurred within a period of time (e.g., a number of profile changes that occurred during a day, a number of profile changes that occurred during a morning, a number of profile changes that occurred during an afternoon, etc.), a number of profile changes that are scheduled to occur within a period of time (e.g., a number of profile changes that are scheduled to occur during a day, a number of profile changes that are scheduled to occur during a morning, a number of profile changes that are scheduled to occur during an afternoon, etc.), a number of zones utilized in a profile, and a difference between a number of zones of a first profile and a number of zones of a second (e.g., when changing from the first profile to the second profile), among others. In one example, the one or more learned criteria and an associated event may be learned from a single user. In another example, the one or more learned criteria and an associated event may be learned from multiple users (e.g., crowd sourced).

In one or more embodiments, a GUI 250 may be displayed within boundaries of a GUI zone 254 of a GUI profile 252. In one example, GUI 250D may be displayed within boundaries of GUI zone 254A of GUI profile 252A. In a second example, GUI 250G may be displayed within boundaries of GUI zone 254B of GUI profile 252A. In another example, GUI 250A may be displayed within boundaries of GUI zone 254C of GUI profile 252A. In one or more embodiments, a GUI zone 254 may be adjacent to one or more other zones 254. In one example, GUI zone 254A may be adjacent to zones 254B and 254C, GUI zone 254B may be adjacent to zones 254A and 254C, and/or GUI zone 254C may be adjacent to zones 254A and 254B. In a second example, as illustrated in FIG. 2F, GUI zone 254J may be adjacent to zones 254K and 254L, GUI zone 254K may be adjacent to zones 254J and 254M, GUI zone 254M may be adjacent to zones 254K and 254L, and/or GUI zone 254L may be adjacent to zones 254J and 254M. For instance, GUI zone 254J may not be adjacent to GUI zone 254M, GUI zone 254K may not be adjacent to GUI zone 254L, GUI zone 254M may not be adjacent to GUI zone 254J, and/or GUI zone 254L may not be adjacent to GUI zone 254K. In another example, as shown in FIG. 2J, GUI zone 254G may be adjacent to GUI zone 254H, GUI zone 254H may be adjacent to zones 254F and 254I, and GUI zone 254I may be adjacent to GUI zone 254H. For instance, GUI zone 254G may not be adjacent to GUI zone 254I, and/or GUI zone 254I may not be adjacent to GUI zone 254G.

Turning now to FIG. 3A, an example of an I/O routing device is illustrated, according to one or more embodiments. As shown, I/O routing device 240 may include a processor 320, an interface 330, wireless interfaces 332 and 334, physical interfaces 340A-340J, physical interfaces 341A-341J, physical interfaces 342A-342J, physical interfaces 344A-344K, physical interfaces 346A-346K, physical interfaces 348A-348L, a volatile memory medium 350, a non-volatile memory medium 370, and a network interface 380. In one or more embodiments, interface 330, volatile memory medium 350, non-volatile memory medium 370, and network interface 380 may be communicatively coupled to processor 320. In one or more embodiments, wireless interfaces 332 and 334 may be communicatively coupled to interface 330. In one or more embodiments, physical interfaces 340A-340J, physical interfaces 341A-341J, physical interfaces 342A-342J, physical interfaces 344A-344K, physical interfaces 346A-346K, and physical interfaces 348A-348L may be communicatively coupled to interface 330, although not specifically illustrated.

In one or more embodiments, interface 330 may include circuitry that enables communicatively coupling one or more input and/or output devices to multiple information handling systems. In one example, interface 330 may include circuitry that enables communicatively coupling one or more displays to multiple information handling systems. In another example, interface 330 may include circuitry that enables communicatively coupling one or more peripheral devices to multiple information handling systems. In one instance, a peripheral device may be or include a keyboard. In a second instance, a peripheral device may be or include a pointing device (e.g., a mouse, a cursor device, a touchpad, a trackball, a light pen, a graphics tablet, etc.). In a third instance, a peripheral device may be or include a game controller (e.g., a joystick, a flight simulator yoke, a throttle, a pedal, a steering wheel, a dance pad, a directional pad (D-pad), a control pad, a remote control device, a video game accessory, etc.). In a fourth instance, a peripheral device may be or include a camera. In a fifth instance, a peripheral device may be or include a speaker. In a sixth instance, a peripheral device may be or include a display. In a seventh instance, a peripheral device may be or include a touch screen. In an eighth instance, a peripheral device may be or include a non-volatile memory medium (e.g., a thumb drive, a flash drive, a removable hard drive, a portable hard drive, etc.). In a ninth instance, a peripheral device may be or include a printer. In a tenth instance, a peripheral device may be or include a computer numerical control (CNC) device (e.g., a milling machine, a three-dimensional printer, a lathe, a plasma cutter, a water jet cutter, etc.). In another instance, a peripheral device may be or include a musical instrument digital interface (MIDI) device (e.g., an electronic music keyboard, an electronic music guitar, a music synthesizer, a music sampler, a drum machine, a music effects device, etc.).

In one or more embodiments, wireless interface 332 may be utilized to wirelessly communicate with a display 220. In one or more embodiments, wireless interface 334 may be utilized to wirelessly communicate with a peripheral device. For example, wireless interface 334 may be or include a Bluetooth interface, an IEEE 802.15 interface, a Zigbee interface, a 6LoPAN interface, a wireless USB interface, and/or a proprietary wireless protocol interface.

In one or more embodiments, one or more of physical interfaces 340A-340J may be utilized to receive video and/or audio data from a first information handling system. For example, interface 330 may utilize one or more of physical interfaces 340A-340J to receive video and/or audio data from IHS 110A. In one instance, one or more of physical interfaces 340A-340J may include one or more display port interfaces. In a second instance, one or more of physical interfaces 340A-340J may include one or more digital visual interface (DVI) interfaces. In a third instance, one or more of physical interfaces 340A-340J may include one or more video graphics array (VGA) interfaces. In a fourth instance, one or more of physical interfaces 340A-340J may include one or more high-definition multimedia interface (HDMI) interfaces. In another instance, one or more of physical interfaces 340A-340J may include one or more Thunderbolt interfaces. Although physical interfaces 340A-340J are illustrated, I/O routing device 240 may be configured with any number of physical interfaces 340, according to one or more embodiments.

In one or more embodiments, one or more of physical interfaces 341A-341J may be utilized to receive video and/or audio data from a second information handling system. For example, interface 330 may utilize one or more of physical interfaces 341A-341J to receive video and/or audio data from IHS 110B. In one instance, one or more of physical interfaces 341A-341J may include one or more display port interfaces. In a second instance, one or more of physical interfaces 341A-341J may include one or more DVI interfaces. In a third instance, one or more of physical interfaces 341A-341J may include one or more VGA interfaces. In a fourth instance, one or more of physical interfaces 341A-341J may include one or more HDMI interfaces. In another instance, one or more of physical interfaces 341A-341J may include one or more Thunderbolt interfaces. Although physical interfaces 341A-341J are illustrated, I/O routing device 240 may be configured with any number of physical interfaces 341, according to one or more embodiments.

In one or more embodiments, one or more of physical interfaces 342A-342J may be utilized to provide video and/or audio data to one or more displays. For example, interface 330 may utilize one or more of physical interfaces 342A-342J to provide video and/or audio data to one or more of displays 220A-220C. In one instance, one or more of physical interfaces 342A-342J may include one or more display port interfaces. In a second instance, one or more of physical interfaces 342A-342J may include one or more DVI interfaces. In a third instance, one or more of physical interfaces 342A-342J may include one or more VGA interfaces. In a fourth instance, one or more of physical interfaces 342A-342J may include one or more HDMI interfaces. In another instance, one or more of physical interfaces 342A-342J may include one or more Thunderbolt interfaces. Although physical interfaces 342A-342J are illustrated, I/O routing device 240 may be configured with any number of physical interfaces 342, according to one or more embodiments.

In one or more embodiments, one or more of physical interfaces 344A-344K may be utilized to receive user input data from one or more peripheral devices. For example, interface 330 may utilize one or more of physical interfaces 344A-344K to receive user input data from one or more of keyboard 230 and mouse 232, among others. In one instance, one or more of physical interfaces 344A-344K may include one or more USB interfaces. In a second instance, one or more of physical interfaces 344A-344K may include one or more IEEE 1394 interfaces. In another instance, one or more of physical interfaces 344A-344K may include one or more Thunderbolt interfaces. Although physical interfaces 344A-344K are illustrated, I/O routing device 240 may be configured with any number of physical interfaces 344, according to one or more embodiments.

In one or more embodiments, one or more of physical interfaces 346A-346K may be utilized to provide user input data, from one or more peripherals, to a first information handling system. For example, interface 330 may utilize one or more of physical interfaces 346A-346K to provide user input data, from one or more peripherals, to IHS 110A. In one instance, one or more of physical interfaces 346A-346K may include one or more USB interfaces. In a second instance, one or more of physical interfaces 346A-346K may include one or more IEEE 1394 interfaces. In another instance, one or more of physical interfaces 346A-346K may include one or more Thunderbolt interfaces. Although physical interfaces 346A-346K are illustrated, I/O routing device 240 may be configured with any number of physical interfaces 346, according to one or more embodiments.

In one or more embodiments, one or more of physical interfaces 348A-348K may be utilized to provide user input data, from one or more peripherals, to a second information handling system. For example, interface 330 may utilize one or more of physical interfaces 348A-348K to provide user input data, from one or more peripherals, to IHS 110B. In one instance, one or more of physical interfaces 348A-348K may include one or more USB interfaces. In a second instance, one or more of physical interfaces 348A-348K may include one or more IEEE 1394 interfaces. In another instance, one or more of physical interfaces 348A-348K may include one or more Thunderbolt interfaces. Although physical interfaces 348A-348K are illustrated, I/O routing device 240 may be configured with any number of physical interfaces 348, according to one or more embodiments.

In one or more embodiments, non-volatile memory medium 370 may include a I/O routing device firmware (FW) 373, which may include an OS 362 and APPs 364-368, and may include I/O routing device data 377. In one example, OS 362 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 362 may be or include an Unix-like operating system. For instance, the Unix-like operating system may be or include LINUX®, FREEBSD®, NETBSD®, OpenBSD, Minix, Xinu, or Darwin, among others. In another example, OS 362 may be or include a portable operating system interface (POSIX) compliant operating system.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with at least a portion of one or more systems, at least a portion of one or more flowcharts, one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may execute instructions in accordance with at least a portion of one or more of systems, flowcharts, at least a portion of one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may utilize I/O routing device data 377. In one example, processor 320 may utilize I/O routing device data 377 via non-volatile memory medium 370. In another example, one or more portions of I/O routing device data 377 may be transferred to volatile memory medium 350, and processor 320 may utilize I/O routing device data 377 via volatile memory medium 350.

In one or more embodiments, network interface 380 may be utilized in communicating with one or more networks and/or one or more other information handling systems. In one example, network interface 380 may enable I/O routing device 240 to communicate via a network utilizing a suitable transmission protocol and/or standard. In a second example, network interface 380 may be coupled to a wired network. In a third example, network interface 380 may be coupled to an optical network. In another example, network interface 380 may be coupled to a wireless network. In one instance, the wireless network may include a wireless Ethernet network (e.g., a Wi-Fi network, an IEEE 802.11 network, etc.). In another instance, the network may include a wireless PAN (e.g., a Bluetooth network, an IEEE 802.15 network, a Zigbee network, etc.).

In one or more embodiments, network interface 380 may be communicatively coupled via a network. For example, the network may be implemented as, or may be a part of, a PAN, a wireless PAN, a LAN, a WLAN, an intranet, an Internet or another appropriate architecture or system that facilitates the communication of signals, data and/or messages (generally referred to as data). For instance, the network may transmit data utilizing a desired communication protocol, including one or more of an IP, other packet-based protocol, or any combination thereof, among others.

Turning now to FIG. 3B, an example of a display that includes an I/O routing device is illustrated, according to one or more embodiments. As shown, a display 220 may include an I/O routing device.

Turning now to FIG. 3C, an example of multiple information handling systems coupled to an I/O routing device is illustrated, according to one or more embodiments. In one or more embodiments, multiple information handling systems may be communicatively coupled to an I/O routing device. In one example, the multiple information handling systems may be communicatively coupled to the I/O routing device in a wired fashion. In another example, the multiple information handling systems may be communicatively coupled to the I/O routing device in a wireless fashion. As illustrated, information handling systems 110A and 110B may be communicatively coupled to I/O device 240.

In one or more embodiments, one or more peripheral devices may be communicatively coupled to an I/O routing device. In one example, the one or more peripheral devices may be communicatively coupled to the I/O routing device in a wired fashion. In another example, the one or more peripheral devices may be communicatively coupled to the I/O routing device in a wireless fashion. As shown, peripheral devices may be communicatively coupled to I/O routing device 240.

In one or more embodiments, one or more displays may be communicatively coupled to an I/O routing device. In one example, the one or more displays may be communicatively coupled to an I/O routing device in a wired fashion. In another example, the one or more displays may be communicatively coupled to an I/O routing device in a wireless fashion. As illustrated, displays 220A-220C may be communicatively coupled to I/O routing device 240.

Figure 4:
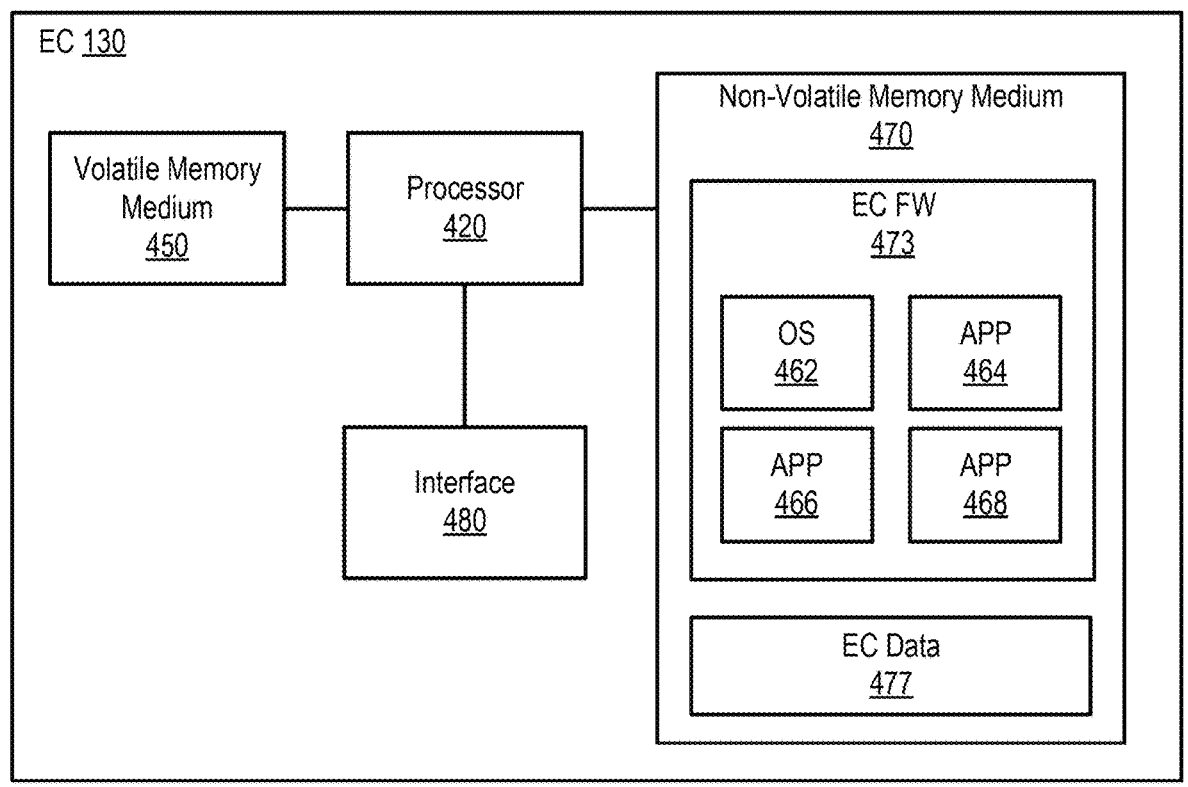
FIG. 4 illustrates an example of an embedded controller, according to one or more embodiments.

Turning now to FIG. 4, an example of an embedded controller is illustrated, according to one or more embodiments. As shown, EC 130 may include a processor 420, a volatile memory medium 450, a non-volatile memory medium 470, and an interface 480. As illustrated, non-volatile memory medium 470 may include an EC FW 473, which may include an OS 462 and APPs 464-468, and may include EC data 477. In one example, OS 462 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 462 may be or include an Unix-like operating system. For instance, the Unix-like operating system may be or include LINUX®, FREEBSD®, NETBSD®, OpenBSD, Minix, Xinu, or Darwin, among others. In another example, OS 462 may be or include a POSIX compliant operating system.

In one or more embodiments, interface 480 may include circuitry that enables communicatively coupling to one or more devices. In one example, interface 480 may include circuitry that enables communicatively coupling to one or more buses. For instance, the one or more buses may include one or more buses described herein, among others. In a second example, interface 480 may include circuitry that enables one or more interrupt signals to be received. In one instance, interface 480 may include general purpose input/output (GPIO) circuitry, and the GPIO circuitry may enable one or more interrupt signals to be received and/or provided via at least one interrupt line. In another instance, interface 480 may include GPIO circuitry that may enable EC 130 to provide and/or receive signals associated with other circuitry (e.g., diagnostic circuitry, etc.) and/or sensors 132. In a third example, interface 480 may include circuitry that enables communicatively coupling to one or more networks. In one instance, interface 480 may include circuitry that enables communicatively coupling to network interface 180. In another example, interface 480 may include a network interface. In one or more embodiments, interface 480 may include circuitry that includes an analog to digital converter (ADC). For example, the ADC may receive one or more analog signals and convert the one or more analog signals to digital data. For instance, EC 130 may receive one or more analog signals from a sensor 132, and the ADC convert the one or more analog signals to digital data for utilization by processor 420.

In one or more embodiments, one or more of OS 462 and APPs 464-468 may include processor instructions executable by processor 420. In one example, processor 420 may execute processor instructions of one or more of OS 462 and APPs 464-468 via non-volatile memory medium 470. In another example, one or more portions of the processor instructions of the one or more of OS 462 and APPs 464-468 may be transferred to volatile memory medium 450, and processor 420 may execute the one or more portions of the processor instructions of the one or more of OS 462 and APPs 464-468 via volatile memory medium 450. In one or more embodiments, processor 420 may execute instructions in accordance with at least a portion of one or more systems, at least a portion of one or more flowcharts, one or more methods, and/or at least a portion of one or more processes described herein. For example, non-volatile memory medium 470 and/or volatile memory medium 450 may store instructions that may be executable in accordance with at least a portion of one or more systems, at least a portion of one or more flowcharts, at least a portion of one or more methods, and/or at least a portion of one or more processes described herein. In one or more embodiments, processor 420 may execute instructions in accordance with at least a portion of one or more of systems, flowcharts, at least a portion of one or more methods, and/or at least a portion of one or more processes described herein. For example, non-volatile memory medium 470 and/or volatile memory medium 450 may store instructions that may be executable in accordance with at least a portion of one or more of systems, at least a portion of one or more flowcharts, at least a portion of one or more methods, and/or at least a portion of one or more processes described herein. In one or more embodiments, processor 420 may utilize EC data 477. In one example, processor 420 may utilize EC data 477 via non-volatile memory medium 470. In another example, one or more portions of EC data 477 may be transferred to volatile memory medium 450, and processor 420 may utilize EC data 477 via volatile memory medium 450.

Figure 5:
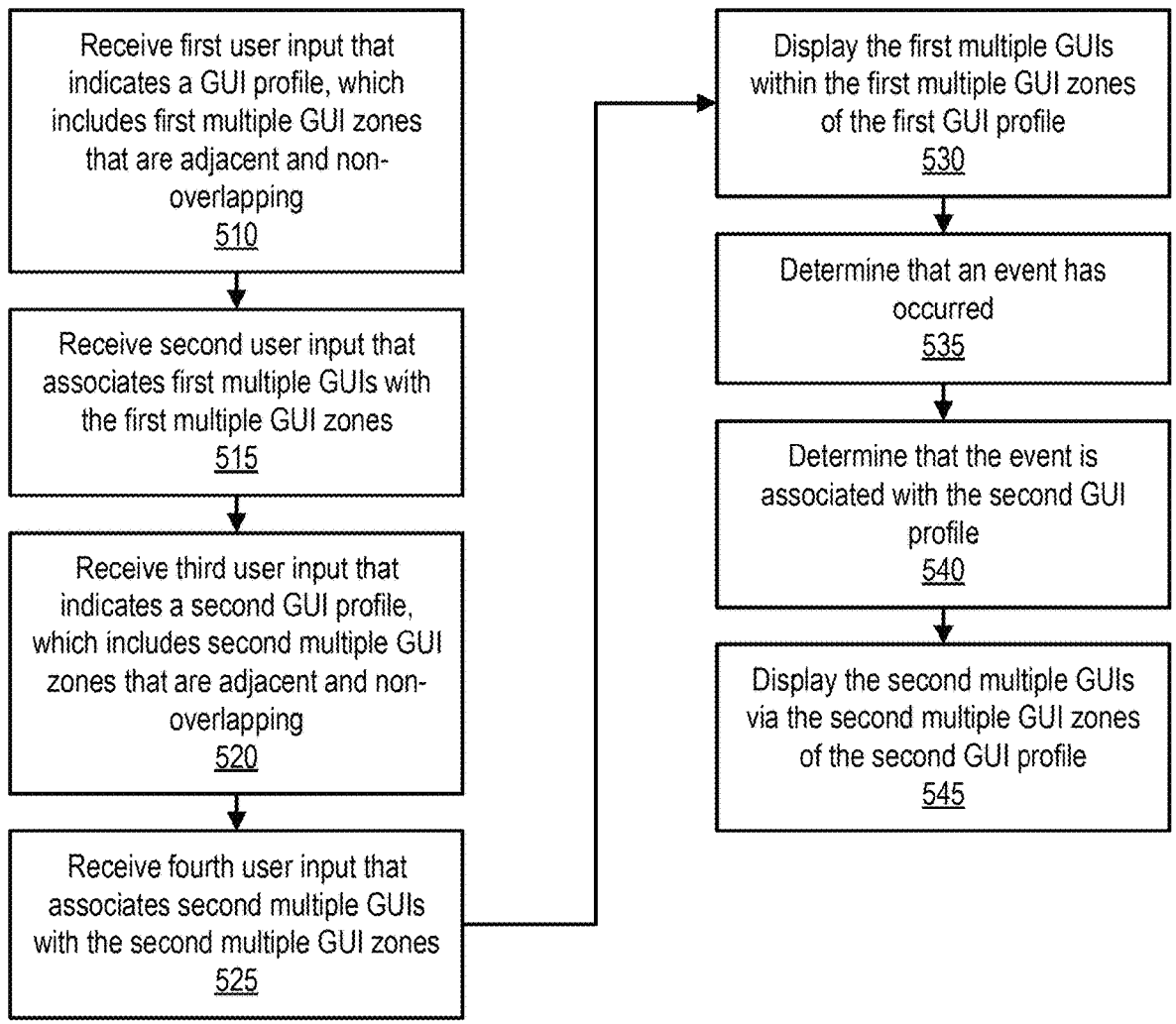
FIG. 5 illustrates an example of a method of operating a system, according to one or more embodiments.

Turning now to FIG. 5, an example of a method of operating a system is illustrated, according to one or more embodiments. At 510, first user input that indicates a first GUI profile, which includes first multiple GUI zones that are adjacent and non-overlapping, may be received. For example, IHS 110A may receive first user input that indicates a GUI profile, which includes first multiple GUI zones that are adjacent and non-overlapping. At 515, second user input that associates first multiple GUIs with the first multiple GUI zones may be received. For example, IHS 110A may receive second user input that associates first multiple GUIs with the first multiple GUI zones. In one or more embodiments, at least two of the first multiple GUIs may be GUIs of a single application.

At 520, third user input that indicates a second GUI profile, which includes second multiple GUI zones that are adjacent and non-overlapping, may be received. For example, IHS 110A may receive third user input that indicates a second GUI profile, which includes second multiple GUI zones that are adjacent and non-overlapping. At 525, fourth user input that associates second multiple GUIs with the second multiple GUI zones may be received. For example, IHS 110A may receive fourth user input that associates second multiple GUIs with the second multiple GUI zones. At 530, the first multiple GUIs within the first multiple GUI zones of the first GUI profile may be displayed. For example, a display 220, communicatively coupled to IHS 110, may display the first multiple GUIs within the first multiple GUI zones of the first GUI profile.

At 535, it may be determined that an event has occurred. For example, IHS 110A may determine that an event has occurred. In one or more embodiments, the event may be associated with a date and a time. For example, determining that the event has occurred includes determining that a present time and a present date matches the date and the time. In one or more embodiments, IHS 110A may include an internal timing device (e.g., an internal clock, an internal real time clock, etc.) which may provide time information to processor 110 of IHS 110A. For example, the time information may include the a present time and the present date. For instance, the time information may include one or more of a present number of second, a present number of minutes, a present number of hours, a present number of days (e.g., a present day of a month), a present number of months (e.g., a present month of a year), and a present number of years (e.g., a present year), among others.

At 540, it may be determined that the event is associated with the second GUI profile. For example, IHS 110A may determine that the event is associated with the second GUI profile. At 545, the second multiple GUIs via the second multiple GUI zones of the second GUI profile may be displayed via the display. For example, display 220 may display the second multiple GUIs via the second multiple GUI zones of the second GUI profile. In one instance, IHS 110A may display, via display 220, the second multiple GUIs via the second multiple GUI zones of the second GUI profile. In another instance, IHS 110B may display, via display 220, the second multiple GUIs via the second multiple GUI zones of the second GUI profile.

In one or more embodiments, physical location information associated with the second GUI profile may be stored. For example, the physical location information associated with the second GUI profile may be stored via one or more of memory media 150 and 160, among others. For instance, IHS 110A may store the physical location information associated with the second GUI profile via one or more of memory media 150 and 160, among others.

In one or more embodiments, present physical location information associated with the first information handling system may be determined. For example, present physical location information associated with IHS 110A may be determined. For instance, the present physical location information associated with IHS 110A may be where IHS 110A is currently physically located. In one or more embodiments, location device 134 may determine the present physical location information.

In one or more embodiments, determining that the event has occurred may include determining that the present physical location information associated with the first information handling system matches the physical location information associated with the second GUI profile. For example, determining that the event has occurred may include determining that the present physical location information associated with IHS 110A matches the physical location information associated with the second GUI profile.

In one or more embodiments, fifth user input indicating at least one of a contrast level value, a brightness level value, and a gamut level value associated with the second GUI profile may be received. For example, IHS 110A may receive fifth user input indicating at least one of a contrast level value, a brightness level value, and a gamut level value associated with the second GUI profile. For instance, displaying the second multiple GUIs via the second multiple GUI zones of the second GUI profile may include adjusting the display in accordance with the at least one of the contrast level value, the brightness level value, and the gamut level value associated with the second GUI profile.

In one or more embodiments, after determining that the event is associated with the second GUI profile, configuration information may be provided to an I/O routing device, which is communicatively coupled to the display and the first information handling system, that indicates that a second information handling system communicatively coupled to the I/O routing device is to utilize the display. For example, after determining that the event is associated with the second GUI profile, IHS 110A may provide configuration information to I/O routing device 240 that indicates that IHS 110B is to utilize the display.

In one or more embodiments, displaying the second multiple GUIs via the second plurality of GUI zones of the second GUI profile may include displaying, by the second information handling system via the display, the second multiple GUIs via the second multiple GUI zones of the second GUI profile. For example, displaying the second multiple GUIs via the second plurality of GUI zones of the second GUI profile may include IHS 110B displaying, via display 220, the second multiple GUIs via the second multiple GUI zones of the second GUI profile.

In one or more embodiments, before determining that the event is associated with the second GUI profile: fifth user input may be received via at least one of a keyboard communicatively coupled to the I/O routing device and a pointing device communicatively coupled to the I/O routing device may be received by the I/O routing device, among others; and the fifth user input may be provided to the first information handling system by the I/O routing device. For example, fifth user input may be received via at least one of keyboard 230 and mouse 232, among others, may be received by I/O routing device 240, and the fifth user input may be provided to IHS 110A by I/O routing device 240.

In one or more embodiments, the configuration information from the first information handling system may be received by the I/O routing device. For example, I/O device 240 may receive the configuration information from IHS 110A. In one or more embodiments, after the receiving the configuration information from the first information handling system: sixth user input may be received via the at least one of the keyboard communicatively coupled to the I/O routing device and the pointing device communicatively coupled to the I/O routing device; and the I/O routing device may provide the sixth user input to the second information handling system. For example, sixth user input may be received via the at least one of keyboard 230 and mouse 232, among others, by I/O routing device 240; and I/O routing device 240 may provide the sixth user input to IHS 110B.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An system, comprising:
a display; and
a first information handling system that is communicatively coupled to the display and that includes:
   at least a first processor; and
   a first memory medium, coupled to the at least the first processor, that stores first instructions executable by the at least the first processor, which when executed by the at least the first processor, cause the first information handling system to:
receive first user input that indicates a first graphical user interface (GUI) profile, which includes a first plurality of GUI zones that are adjacent and non-overlapping;
receive second user input that associates a first plurality of graphical user interfaces (GUIs) with the first plurality of GUI zones;
receive third user input that indicates a second GUI profile, which includes a second plurality of GUI zones that are adjacent and non-overlapping;
receive fourth user input that associates a second plurality of GUIs with the second plurality of GUI zones;
display, via the display, the first plurality of GUIs within the first plurality of GUI zones of the first GUI profile;
determine that an event has occurred; and
determine that the event is associated with the second GUI profile;
wherein the system is configured to display, via the display, the second plurality of GUIs via the second plurality of GUI zones of the second GUI profile.

2. The system of claim 1, wherein at least two of the first plurality of GUIs are GUIs of a single application.

3. The system of claim 1,
wherein the event is associated with a date and a time; and
wherein, to determine that the event has occurred, the first instructions further cause the first information handling system to determine that a present time and a present date matches the date and the time.

4. The system of claim 1,
wherein the first instructions further cause the first information handling system to:
store physical location information associated with the second GUI profile; and
determine present physical location information associated with the first information handling system; and
wherein, to determine that the event has occurred, the first instructions further cause the first information handling system to determine that the present physical location information associated with the information handling system matches the physical location information associated with the second GUI profile.

5. The system of claim 1,
wherein the first instructions further cause the first information handling system to receive fifth user input indicating at least one of a contrast level value, a brightness level value, and a gamut level value associated with the second GUI profile; and
wherein, to display the second plurality of GUIs via the second plurality of GUI zones of the second GUI profile, the first instructions further cause the first information handling system to adjust the display in accordance with the at least one of the contrast level value, the brightness level value, and the gamut level value associated with the second GUI profile.

6. The system of claim 1, further comprising:
an I/O routing device communicatively coupled to the display; and
a second information handling system communicatively is coupled to the I/O routing device and to the display via the I/O routing device;
wherein the first information handling system is communicatively coupled to the I/O routing device and is communicatively coupled to display via the I/O routing device;
wherein the first instructions further cause the first information handling system to, after determining that the event is associated with the second GUI profile, provide configuration information to the I/O routing device that indicates that the second information handling system is to utilize the display;
wherein the second information handling system includes:
at least a second processor; and
a second memory medium, coupled to the at least the second processor, that stores second instructions executable by the at least the second processor, which when executed by the at least the second processor, cause the second information handling system to:
display, via the display, the second plurality of GUIs via the second plurality of GUI zones of the second GUI profile.

7. The system of 6, further comprising:
a keyboard communicatively coupled to the I/O routing device; and
a pointing device communicatively coupled to the I/O routing device;
wherein, before determining that the event is associated with the second GUI profile, the IO routing device is configured to:
receive fifth user input via at least one of the keyboard and the pointing device; and
provide the fifth user input to the first information handling system;
receive the configuration information from the first information handling system; and
wherein, after receiving the configuration information from the first information handling system the IO routing device is further configured to:
receive sixth user input via the at least one of the keyboard and the pointing device; and
provide the sixth user input to the second information handling system.

8. A method, comprising:
receiving, by a first information handling system, first user input that indicates a first graphical user interface (GUI) profile, which includes a first plurality of GUI zones that are adjacent and non-overlapping;
receiving, by the first information handling system, second user input that associates a first plurality of graphical user interfaces (GUIs) with the first plurality of GUI zones;
receiving, by the first information handling system, third user input that indicates a second GUI profile, which includes a second plurality of GUI zones that are adjacent and non-overlapping;
receiving, by the first information handling system, fourth user input that associates a second plurality of GUIs with the second plurality of GUI zones;
displaying, via a display communicatively coupled to the first information handling system, the first plurality of GUIs within the first plurality of GUI zones of the first GUI profile;
determining, by the first information handling system, that an event has occurred;

determining, by the first information handling system, that the event is associated with the second GUI profile; and displaying, via the display, the second plurality of GUIs via the second plurality of GUI zones of the second GUI profile.

9. The method of claim 8, wherein at least two of the first plurality of GUIs are GUIs of a single application.

10. The method of claim 8,
wherein the event is associated with a date and a time; and
wherein the determining that the event has occurred includes determining that a present time and a present date matches the date and the time.

11. The method of claim 8, further comprising:
storing physical location information associated with the second GUI profile; and
determining present physical location information associated with the first information handling system;
wherein the determining that the event has occurred includes determining that the present physical location information associated with the first information handling system matches the physical location information associated with the second GUI profile.

12. The method of claim 8, further comprising:
receiving fifth user input indicating at least one of a contrast level value, a brightness level value, and a gamut level value associated with the second GUI profile;
wherein the displaying the second plurality of GUIs via the second plurality of GUI zones of the second GUI profile includes adjusting the display in accordance with the at least one of the contrast level value, the brightness level value, and the gamut level value associated with the second GUI profile.

13. The method of claim 8, further comprising:
after the determining that the event is associated with the second GUI profile, providing, by the first information handling system, configuration information to an I/O routing device, which is communicatively coupled to the display and the first information handling system, that indicates that a second information handling system communicatively coupled to the I/O routing device is to utilize the display;
wherein the displaying the second plurality of GUIs via the second plurality of GUI zones of the second GUI profile includes displaying, by the second information handling system via the display, the second plurality of GUIs via the second plurality of GUI zones of the second GUI profile.

14. The method of 13, further comprising:
before the determining that the event is associated with the second GUI profile:
receiving, by the I/O routing device, fifth user input via at least one of a keyboard communicatively coupled to the I/O routing device and a pointing device communicatively coupled to the I/O routing device; and
providing, by the I/O routing device, the fifth user input to the first information handling system;
receiving, by the I/O routing device, the configuration information from the first information handling system; and
after the receiving the configuration information from the first information handling system:
receiving, by the I/O routing device, sixth user input via the at least one of the keyboard communicatively coupled to the I/O routing device and the pointing device communicatively coupled to the I/O routing device; and
providing, by the I/O routing device, the sixth user input to the second information handling system.

15. A computer-readable non-transitory memory medium that includes instructions that, when executed by at least one processor of an information handling system, cause the information handling system to:
receive first user input that indicates a first graphical user interface (GUI) profile, which includes a first plurality of GUI zones that are adjacent and non-overlapping;
receive second user input that associates a first plurality of graphical user interfaces (GUIs) with the first plurality of GUI zones;
receive third user input that indicates a second GUI profile, which includes a second plurality of GUI zones that are adjacent and non-overlapping;
receive fourth user input that associates a second plurality of GUIs with the second plurality of GUI zones;
display, via a display communicatively coupled to the information handling system, the first plurality of GUIs within the first plurality of GUI zones of the first GUI profile;
determine that an event has occurred;
determine that the event is associated with the second GUI profile; and
display, via the display, the second plurality of GUIs via the second plurality of GUI zones of the second GUI profile.

16. The computer-readable non-transitory memory medium of claim 15, wherein at least two of the first plurality of GUIs are GUIs of a single application.

17. The computer-readable non-transitory memory medium of claim 15,
wherein the event is associated with a date and a time; and
wherein, to determine that the event has occurred, the instructions further cause the information handling system to determine that a present time and a present date matches the date and the time.

18. The computer-readable non-transitory memory medium of claim 15,
wherein the instructions further cause the information handling system to:
store physical location information associated with the second GUI profile; and
determine present physical location information associated with the first information handling system; and
wherein, to determine that the event has occurred, the instructions further cause the information handling system to determine that the present physical location information associated with the information handling system matches the physical location information associated with the second GUI profile.

19. The computer-readable non-transitory memory medium of claim 15,
wherein the instructions further cause the information handling system to receive fifth user input indicating at least one of a contrast level value, a brightness level value, and a gamut level value associated with the second GUI profile; and
wherein, to display the second plurality of GUIs via the second plurality of GUI zones of the second GUI profile, the instructions further cause the information handling system to adjust the display in accordance with the at least one of the contrast level value, the brightness level value, and the gamut level value associated with the second GUI profile.

20. The computer-readable non-transitory memory medium of claim 15,
   wherein the event is associated with a physical location; and
   wherein, to determine that the event has occurred, the instructions further cause the information handling system to determine that a present physical location matches the physical location.

* * * * *